(12) United States Patent
Sewak

(10) Patent No.: US 10,956,928 B2
(45) Date of Patent: Mar. 23, 2021

(54) COGNITIVE FASHION PRODUCT ADVERTISEMENT SYSTEM AND METHOD

(71) Applicant: International Business Machines Corporation, Armonk, NY (US)

(72) Inventor: Mohit Sewak, Lucknow (IN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 15/982,254

(22) Filed: May 17, 2018

(65) Prior Publication Data
US 2019/0355008 A1 Nov. 21, 2019

(51) Int. Cl.
G06Q 30/00 (2012.01)
G06Q 30/02 (2012.01)
G05B 19/418 (2006.01)

(52) U.S. Cl.
CPC ..... *G06Q 30/0239* (2013.01); *G06Q 30/0271* (2013.01); *G06Q 30/0275* (2013.01); *G06Q 30/0277* (2013.01)

(58) Field of Classification Search
CPC .......... G06Q 30/0239; G06Q 30/0271; G06Q 30/0277; G06Q 30/0275
See application file for complete search history.

(56) References Cited

U.S. PATENT DOCUMENTS

| | | |
|---|---|---|
| 5,749,081 A | 5/1998 | Whiteis |
| 6,266,649 B1 | 7/2001 | Linden et al. |
| 7,007,074 B2 | 2/2006 | Radwin |
| 7,113,917 B2 | 9/2006 | Jacobi et al. |
| 7,617,016 B2 | 11/2009 | Wannier et al. |
| 7,921,061 B2 | 4/2011 | Rangarajan et al. |
| 7,979,877 B2 | 7/2011 | Huber et al. |
| 8,620,707 B1 | 12/2013 | Belyi et al. |
| 8,751,930 B2 | 6/2014 | Jhoney et al. |
| 8,908,962 B2 | 12/2014 | Bhardwaj et al. |
| 9,135,491 B2 | 9/2015 | Morandi et al. |
| 9,141,886 B2 | 9/2015 | Auclair et al. |
| 9,661,886 B1 | 5/2017 | Selvarajan |

(Continued)

FOREIGN PATENT DOCUMENTS

| | | |
|---|---|---|
| CN | 104281890 A | 1/2015 |
| CN | 110363213 A | 10/2019 |

(Continued)

OTHER PUBLICATIONS

A Framework for Automatic Online Personalization. (Year: 2015).*

(Continued)

*Primary Examiner* — Maria V Vanderhorst
(74) *Attorney, Agent, or Firm* — Reza Sarbakhsh

(57) ABSTRACT

A method, computer program product, and computing system are provided for identifying an advertising opportunity on a first website in response to a user accessing the first website. Information associated with the user accessing the first website may be received. One or more digital advertisements of one or more fashion products from the second website may be provided for rendering on the first website based upon, at least in part, one or more fashion-ability scores representative of the one or more fashion products on the second website and the information associated with the user accessing the first website.

20 Claims, 9 Drawing Sheets

(56) References Cited

U.S. PATENT DOCUMENTS

| | | | |
|---|---|---|---|
| 9,785,898 | B2 | 10/2017 | Hofman et al. |
| 10,062,039 | B1 | 8/2018 | Lockett |
| 10,540,575 | B1 | 1/2020 | Brody |
| 2006/0277098 | A1* | 12/2006 | Chung .................. G06Q 30/02 705/14.22 |
| 2007/0150801 | A1 | 6/2007 | Chidlovskii et al. |
| 2007/0244842 | A1 | 10/2007 | Ishii et al. |
| 2008/0228749 | A1 | 9/2008 | Brown |
| 2008/0262917 | A1* | 10/2008 | Green .................. G06Q 30/02 705/14.71 |
| 2008/0306819 | A1* | 12/2008 | Berkhin .................. G06Q 30/02 705/14.54 |
| 2008/0307052 | A1 | 12/2008 | Krishnan et al. |
| 2009/0006156 | A1 | 1/2009 | Hunt et al. |
| 2009/0276291 | A1 | 11/2009 | Wannier et al. |
| 2011/0011936 | A1 | 1/2011 | Morandi et al. |
| 2011/0103682 | A1 | 5/2011 | Chidlovskii et al. |
| 2012/0123978 | A1 | 5/2012 | Toderice et al. |
| 2012/0323620 | A1 | 12/2012 | Hofman et al. |
| 2013/0066742 | A1 | 3/2013 | Stevens et al. |
| 2014/0003729 | A1 | 1/2014 | Auclair et al. |
| 2014/0039979 | A1 | 2/2014 | Zhang et al. |
| 2014/0379426 | A1 | 12/2014 | Guo et al. |
| 2015/0046223 | A1 | 2/2015 | Sewak |
| 2015/0058079 | A1 | 2/2015 | Freund et al. |
| 2015/0139485 | A1 | 5/2015 | Bourdev |
| 2015/0254675 | A1 | 9/2015 | Kannan et al. |
| 2015/0324828 | A1 | 11/2015 | Ouimet |
| 2015/0332296 | A1 | 11/2015 | Chu et al. |
| 2015/0339726 | A1 | 11/2015 | Herring et al. |
| 2015/0347933 | A1 | 12/2015 | Sewak |
| 2016/0085889 | A1 | 3/2016 | Sewak |
| 2016/0110794 | A1 | 4/2016 | Hsiao et al. |
| 2016/0125503 | A1 | 5/2016 | Li et al. |
| 2016/0148150 | A1 | 5/2016 | Curtat et al. |
| 2016/0189011 | A1 | 6/2016 | Bhardwaj et al. |
| 2016/0189274 | A1 | 6/2016 | MacLaurin et al. |
| 2016/0225053 | A1 | 8/2016 | Romley et al. |
| 2016/0371261 | A1 | 12/2016 | Cormack et al. |
| 2017/0004567 | A1* | 1/2017 | Dutt .................. G06Q 30/0643 |
| 2017/0098187 | A1 | 4/2017 | Jung et al. |
| 2017/0178061 | A1 | 6/2017 | Griffin et al. |
| 2018/0005035 | A1 | 1/2018 | Bogolea et al. |
| 2018/0005106 | A1 | 1/2018 | Hachiya |
| 2018/0114114 | A1 | 4/2018 | Molchanov et al. |
| 2018/0189725 | A1 | 7/2018 | Mattingly et al. |
| 2018/0218436 | A1 | 8/2018 | Cooper |
| 2018/0349477 | A1* | 12/2018 | Jaech .................. G06F 16/3334 |
| 2019/0043003 | A1 | 2/2019 | Fisher et al. |
| 2019/0220694 | A1 | 7/2019 | Biswas et al. |
| 2019/0251446 | A1 | 8/2019 | Fang et al. |
| 2019/0278426 | A1 | 9/2019 | He et al. |
| 2019/0318209 | A1 | 10/2019 | Sewak et al. |
| 2019/0318210 | A1 | 10/2019 | Sewak et al. |
| 2019/0318299 | A1 | 10/2019 | Sewak |
| 2019/0318304 | A1 | 10/2019 | Sewak |
| 2019/0355041 | A1 | 11/2019 | Sewak |
| 2019/0370874 | A1 | 12/2019 | Brooks et al. |
| 2020/0005087 | A1 | 1/2020 | Sewak |
| 2020/0034781 | A1 | 1/2020 | Sewak et al. |

FOREIGN PATENT DOCUMENTS

| | | |
|---|---|---|
| CN | 110728015 A | 1/2020 |
| JP | 2004508604 A | 3/2004 |
| WO | 2010141637 A1 | 12/2010 |
| WO | 2015127394 A1 | 8/2015 |
| WO | 2016098973 A1 | 6/2016 |

OTHER PUBLICATIONS

IBM "IBM Patent Applications to be Treated as Related," filed May 17, 2018, pp. 1-2.

IBM, U.S. Appl. No. 15/982,202, Patent Application to be treated as Related, for Examiner's Eyes Only, pp. 1-49, May 17, 2018.

Sewak et al., "Practical Convolutional Neural Networks," Implement Advanced Deep Learning Models Using Python, Chapter 2, Feb. 2018, pp. 26-40.

Sewak et al., "Practical Convolutional Neural Networks," Implement Advanced Deep Learning Models Using Python, Chapter 4, Feb. 2018, pp. 92-102.

Sewak et al., "Practical Convolutional Neural Networks," Implement Advanced Deep Learning Models Using Python, Chapter 5, Feb. 2018, pp. 104-113.

Phillips et al., "Narrative and Persuasion in Fashion Advertising," Journal of Consumer Research/Oxford, vol. 37, Issue 3, Oct. 1, 2010, pp. 1-6, Abstract provided.

Davis et al., "Apparel Advertising Appeals as a Function of Apparel Classification: Trendy Versus Classic," Perceptual and Motor Skills, 1989, 68, pp. 1011-1014.

Lennon et al., "Evaluations of Apparel Advertising as a Function of Self-Monitoring," Preceptual and Motor Skills, 1988, 66, pp. 987-996.

Ingram, "Ideas for Advertising Clothes," Chron.com, http://smallbusiness.chron.com/ideas-advertising-clothes-10375.html, downloaded May 1, 2018, pp. 1-5.

LeChat, "Promotional Strategies for a Clothing Store," Chron.com, http://smallbusiness.chron.com/promotional-strategies-clothing-store-13851.html, downloaded May 1, 2018, pp. 1-4.

West, "Fashion Marketing Techniques," Chron.com, http:/smallbusiness.chron.com/fashion-marketing-techniques-65320.html, downloaded May 1, 2018, pp. 1-4.

Reynolds, "Creative Marketing Strategies for the Fashion Industry," Chron.com, http:/smallbusiness.chron.com/creative-marketing-strategies-fashion-industry-67393.html, downloaded May 1, 2018, pp. 1-5.

Masaki, "How to Advertise and market Your Clothing Line," Clothing Line—Advertising and Marketing Tips and Tricks by HTSACC, https://www.howtostartacloghingcompany.com/advertise-market-clothing-line/ downloaded May 1, 2018, pp. 1-13.

Author Unknown, "20 Product Priorization Techniques: A Map and Guided Tour," folding Burritos (https://foldingburritos.com/product-prioritization-techniques/ downloaded May 1, 2018, pp. 1-30.

Witcher et al., "The Forester Wave™: Omnichannel Order Management, Q3 2016", The Nine OMS Providers That Matter Most for Omnichannel Retail and How They Stack Up, for Ebusiness & Channel Strategy Professionals., Forrester.com, Jul. 12, 2016, 20 pages.

Walker, "Inventory Management With Machine Learning—3 Use Cases in Industry", Techemergence, https://www.techemergence.com, Feb. 20, 2018, 10 pages.

Knight, "Inside Amazon's Warehouse, Human-Robot Symbiosis," Intelligent Machines, Jul. 7, 2015, pp. 1-8.

Canitz, "Machine Learning in Supply Chain Planning," Logility Planning Optimized, Oct. 4, 2016, pp. 1-2.

Author Unknown, "Coca-Cola Leverages AI for Inventory Management," Technology News, Supply Chain 24/7 Article, Mar. 28, 2017, pp. 1-11.

Pending U.S. Appl. No. 16/132,867, filed Sep. 17, 2018, entitled: "System and Method for Cognitive and Preemptive Fashion Inventory Management & Order Fulfilment", 53 pages.

Conlon,"The Vogue Glossary", http://www.vogue.co.uk/gallery/the-vogue-glossary, Oct. 17, 2013, 63 pages.

Alves, "Predicting Product Sales in Fashion Retailing: A Data Analytics Approach", Jul. 23, 2017, 59 pages.

Spolini, "Cognitive Computing supports fashion designer", http://www.vogue.it/en/vogue-talents/news/2017/03/29/watson-ibm-jason-grech-marchesa-the-north-face/, Mar. 29, 2017, 4 pages.

McClellan, "Cognitive Marchesa dress lights up the night", https://www.ibm.com/blogs/internet-of-things/cognitive-marchesa-dress/, Oct. 27, 2016, 3 pages.

Rubin, "Weaving Cognitive into Couture: Watson and Marchesa Collaborate for the Met Gala", https://www.ibm.com/blogs/think/2016/04/watson-and-marchesa/, Apr. 29, 2016, 4 pages.

(56) References Cited

OTHER PUBLICATIONS

Mastroianni, "Marchesa, IBM Watson design "cognitive dress" for Met Gala", http://www.cbsnews.com/news/marchesa-ibm-watson-to-debut-cognitive-dress-at-mondays-met-gala/, May 2, 2016, 4 pages.

Fashion Dictionary, http://wwd.com/fashion-dictionary/, Accessed Jun. 25, 2018, 22 pages.

He et al., "Fashion Net: Personalized Outfit Recommendation with Deep Neural Network", arXiv:1810.02443v1, Oct. 4, 2018, 9 pages.

Huang et al., "Outfit Recommendation System Based on Deep Learning", Advances in Computer Science Research, vol. 74, 2nd International Conference on Computer Engineering, Information Science & Technology (ICCIA 2017), pp. 170-174.

Jaradat, "Deep Cross-Domain Fashion Recommendation", Proceedings of the Eleventh ACM Conference on Recommender Systems, Aug. 27-31, 2017, pp. 407-410.

Li et al., "Mining Fashion Outfit Composition Using an End-to-End Deep Learning Approach on Set Data", IEEE Transactions on Multimedia 19.8 (2017), pp. 1946-1955.

Liu et al., "Deepfashion: Powering Robust Clothes Recognition and Retrieval with Rich Annotations", Proceedings of the IEEE Conference on Computer Vision and Pattern Recognition, 2016, pp. 1096-1104.

Nguyen et al., "Learning to Rank for Personalised Fashion Recommender Systems Via Implicit Feedback", Mining Intelligence and Knowledge Exploration, Springer, 2014, pp. 51-61.

Shah et al., "Fashion Outfit Composition by Deep Learning Approach", International Research Journal of Engineering and Technology (IRJET), vol. 05 Issue: 06, Jun. 2018, pp. 1549-1555.

Tuinhof et al., "Image Based Fashion Product Recommendation with Deep Learning", International Conference on Machine Learning, Optimization, and Data Science, Jul. 17, 2018, pp. 1-10.

* cited by examiner

COGNITIVE FASHION PRODUCT ADVERTISEMENT SYSTEM AND METHOD

BACKGROUND

Given the vast number of choices available for fashion products and consumers' rapidly changing fashion tastes, it is difficult to achieve good results from fashion marketing campaigns. Additionally, the price perception of a fashion product may vary from person to person. For example, when advertising a fashion product to a consumer, the advertised product may suite his or her fashion taste, but not at the price perception which it claims, even if he or she could afford it. The cognitive decision making that happens in a consumer's mind while selecting a fashion product is too complex to have a good and successful marketing campaign which does not know how to anticipate or determine a consumer's cognitive decision making. As such, fashion product advertising may be more successful when based on the consumer's cognitive perception of fashion and/or price/value of the fashion.

BRIEF SUMMARY OF DISCLOSURE

In one example implementation, a computer-implemented method is executed on a computing device and may include but is not limited to identifying an advertising opportunity on a first website in response to a user accessing the first website. Information associated with the user accessing the first website may be received. One or more digital advertisements of one or more fashion products from a second website may be provided for rendering on the first website based upon, at least in part, one or more fashion-ability scores representative of the one or more fashion products on the second website and the information associated with the user accessing the first website.

One or more of the following example features may be included. The computer-implemented method may also include pairing the one or more digital advertisements with one or more purchasing incentives based upon, at least in part, the one or more fashion-ability scores representative of the one or more fashion products on the second website. Providing the one or more digital advertisements of the one or more fashion products from the second website may include providing one or more bids for bidding on the advertising opportunity on the first website. Receiving information associated with the user accessing the first website may include associating one or more fashion products with the user accessing the first website. Providing the one or more digital advertisements of the one or more fashion products from the second website may include providing the one or more digital advertisements of the one or more fashion products from the second website based upon, at least in part, one or more fashion-ability scores representative of the one or more fashion products associated with the user accessing the first website and the one or more fashion-ability scores representative of the one or more fashion products on the second website. Providing the one or more digital advertisements of the one or more fashion products from the second website may include providing one or more digital advertisements for one or more fashion products from the second website with a fashion-ability score greater than the fashion-ability score of the one or more fashion products associated with the user accessing the first website. Providing the one or more digital advertisements of the one or more fashion products from the second website may include providing the one or more digital advertisements for rendering on the first website based upon, at least in part, one or more marketing objectives.

In another example implementation, a computer program product resides on a computer readable medium that has a plurality of instructions stored on it. When executed across one or more processors, the plurality of instructions cause at least a portion of the one or more processors to perform operations that may include but are not limited to identifying an advertising opportunity on a first website in response to a user accessing the first website. Information associated with the user accessing the first website may be received. One or more digital advertisements of one or more fashion products from a second website may be provided for rendering on the first website based upon, at least in part, one or more fashion-ability scores representative of the one or more fashion products on the second website and the information associated with the user accessing the first website.

One or more of the following example features may be included. Operations of at least a portion of the one or more processors may also include pairing the one or more digital advertisements with one or more purchasing incentives based upon, at least in part, the one or more fashion-ability scores representative of the one or more fashion products on the second website. Providing the one or more digital advertisements of the one or more fashion products from the second website may include providing one or more bids for bidding on the advertising opportunity on the first website. Receiving information associated with the user accessing the first website may include associating one or more fashion products with the user accessing the first website. Providing the one or more digital advertisements of the one or more fashion products from the second website may include providing the one or more digital advertisements of the one or more fashion products from the second website based upon, at least in part, one or more fashion-ability scores representative of the one or more fashion products associated with the user accessing the first website and the one or more fashion-ability scores representative of the one or more fashion products on the second website. Providing the one or more digital advertisements of the one or more fashion products from the second website may include providing one or more digital advertisements for one or more fashion products from the second website with a fashion-ability score greater than the fashion-ability score of the one or more fashion products associated with the user accessing the first website. Providing the one or more digital advertisements of the one or more fashion products from the second website may include providing the one or more digital advertisements for rendering on the first website based upon, at least in part, one or more marketing objectives.

In another example implementation, a computing system comprising one or more processors and one or more memories, wherein the computing system is configured to perform operations that may include but are not limited to identifying an advertising opportunity on a first website in response to a user accessing the first website. Information associated with the user accessing the first website may be received. One or more digital advertisements of one or more fashion products from a second website may be provided for rendering on the first website based upon, at least in part, one or more fashion-ability scores representative of the one or more fashion products on the second website and the information associated with the user accessing the first website.

One or more of the following example features may be included. Operations of the computing system may also include pairing the one or more digital advertisements with one or more purchasing incentives based upon, at least in part, the one or more fashion-ability scores representative of the one or more fashion products on the second website. Providing the one or more digital advertisements of the one or more fashion products from the second website may include providing one or more bids for bidding on the advertising opportunity on the first website. Receiving information associated with the user accessing the first website may include associating one or more fashion products with the user accessing the first website. Providing the one or more digital advertisements of the one or more fashion products from the second website may include providing the one or more digital advertisements of the one or more fashion products from the second website based upon, at least in part, one or more fashion-ability scores representative of the one or more fashion products associated with the user accessing the first website and the one or more fashion-ability scores representative of the one or more fashion products on the second website. Providing the one or more digital advertisements of the one or more fashion products from the second website may include providing one or more digital advertisements for one or more fashion products from the second website with a fashion-ability score greater than the fashion-ability score of the one or more fashion products associated with the user accessing the first website. Providing the one or more digital advertisements of the one or more fashion products from the second website may include providing the one or more digital advertisements for rendering on the first website based upon, at least in part, one or more marketing objectives.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

Like reference symbols in the various drawings indicate like elements.

DETAILED DESCRIPTION

Figure 1:
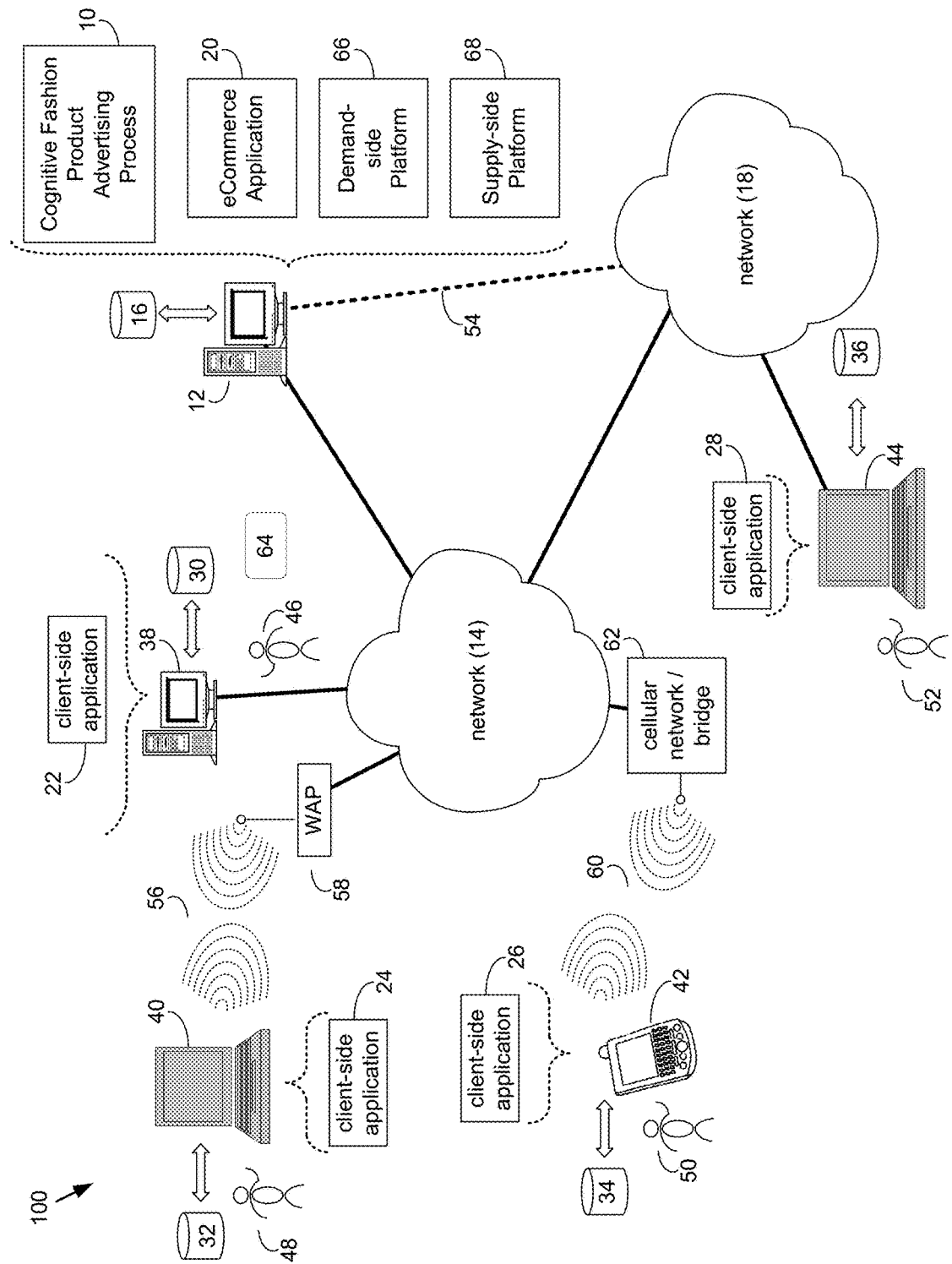
FIG. 1 is an example diagrammatic view of a cognitive fashion product advertising process coupled to a distributed computing network according to one or more example embodiments of the disclosure.
Figure 2:
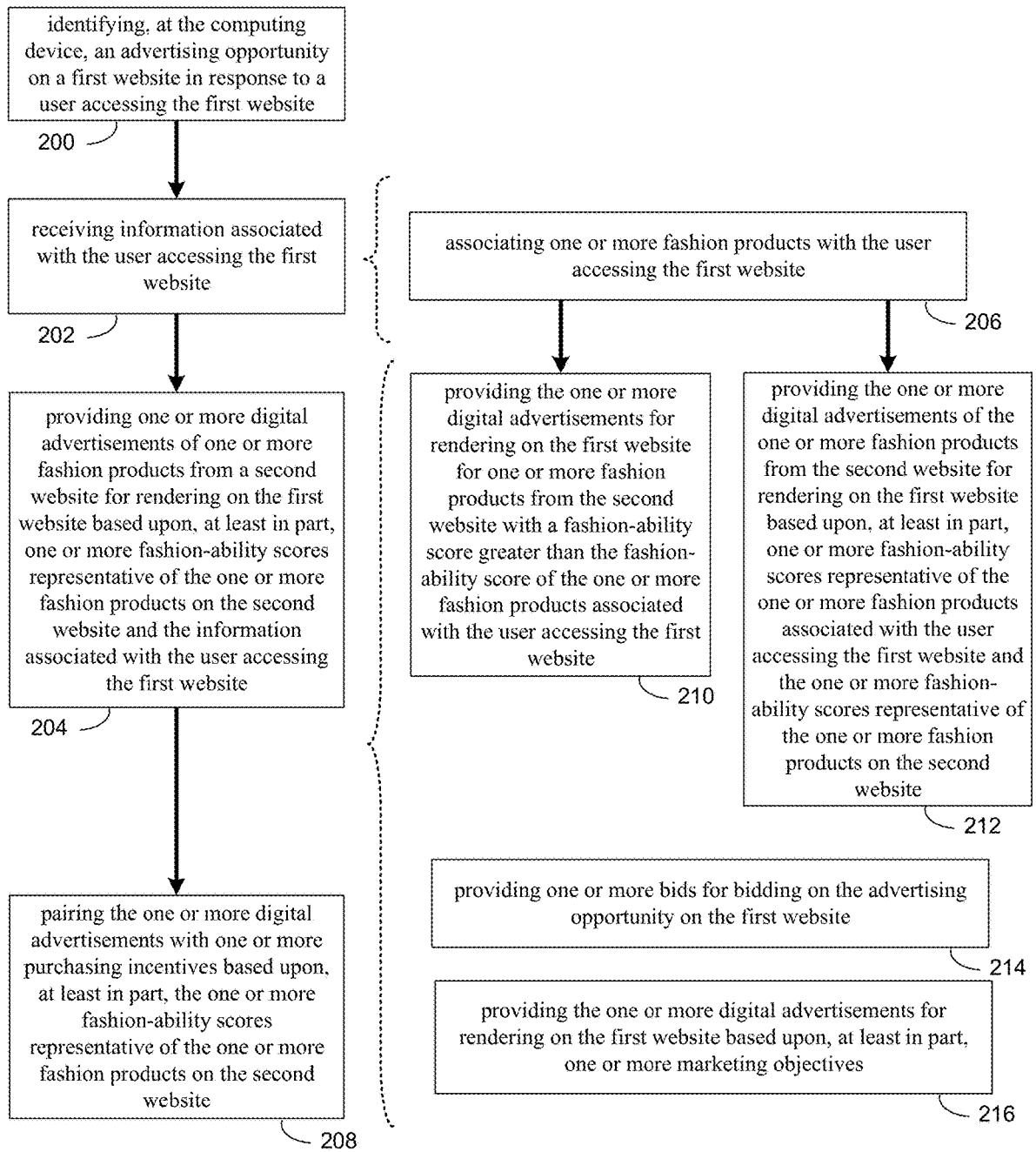
FIG. 2 is an example flowchart of the cognitive fashion product advertising process of FIG. 1 according to one or more example embodiments of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown cognitive fashion product advertising process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a cognitive fashion product advertising process, such as cognitive fashion product advertising process 10 of FIG. 1, may identify an advertising opportunity on a first website in response to a user accessing the first website. Information associated with the user accessing the first website may be received. One or more digital advertisements may be rendered on the first website for one or more fashion products from a second website based upon, at least in part, one or more fashionability scores representative of the one or more fashion products on the second website and the information associated with the user accessing the first website.

The instruction sets and subroutines of cognitive fashion product advertising process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Cognitive fashion product advertising process 10 may be a stand-alone application that interfaces with an applet/application that is accessed via client applications 22, 24, 26, 28. In some embodiments, cognitive fashion product advertising process 10 may be, in whole or in part, distributed in a cloud computing topology. In this way, computing device 12 and storage device 16 may refer to multiple devices, which may also be distributed throughout network 14 and/or network 18.

Computing device 12 may execute an eCommerce application (e.g., eCommerce application 20), examples of which may include, but are not limited to, applications, portals, programs, and/or websites that facilitate the online purchases of one or more products (e.g., fashion products). Cognitive fashion product advertising process 10 and/or eCommerce application 20 may be accessed via client applications 22, 24, 26, 28. Cognitive fashion product advertising process 10 may be a stand-alone application, or may be an applet/application/script/extension that may interact with and/or be executed within eCommerce application 20, a component of eCommerce application 20, and/or one or more of client applications 22, 24, 26, 28. eCommerce application 20 may be a stand-alone application, or may be an applet/application/script/extension that may interact with and/or be executed within cognitive fashion product advertising process 10, a component of cognitive fashion product advertising process 10, and/or one or more of client applications 22, 24, 26, 28. One or more of client applications 22, 24, 26, 28 may be a stand-alone application, or may be an applet/application/script/extension that may interact with and/or be executed within and/or be a component of cognitive fashion product advertising process 10 and/or eCommerce application 20. Examples of client applications 22, 24, 26, 28 may include, but are not limited to, applications that receive queries to search for content from one or more databases, servers, cloud storage servers, etc., a textual and/or a graphical user interface, a standard web browser, a customized web browser, a plugin, an Application Programming Interface (API), or a custom application. The instruction sets and subroutines of client applications 22, 24, 26, 28 which may be stored on storage devices 30, 32, 34, 36 coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28 may be configured to effectuate some or all of the functionality of cognitive fashion product advertising process 10 (and vice versa). Accordingly, cognitive fashion product advertising process 10 may be a purely server-side application, a purely client-side application, or a hybrid server-side/client-side application that is cooperatively executed by one or more of client applications 22, 24, 26, 28 and/or cognitive fashion product advertising process 10.

One or more of client applications 22, 24, 26, 28 may be configured to effectuate some or all of the functionality of eCommerce application 20 (and vice versa). Accordingly, eCommerce application 20 may be a purely server-side application, a purely client-side application, or a hybrid server-side/client-side application that is cooperatively executed by one or more of client applications 22, 24, 26, 28 and/or eCommerce application 20. As one or more of client applications 22, 24, 26, 28 cognitive fashion product advertising process 10, and eCommerce application 20, taken singly or in any combination, may effectuate some or all of the same functionality, any description of effectuating such functionality via one or more of client applications 22, 24, 26, 28 cognitive fashion product advertising process 10, eCommerce application 20, or combination thereof, and any described interaction(s) between one or more of client applications 22, 24, 26, 28 cognitive fashion product advertising process 10, eCommerce application 20, or combination thereof to effectuate such functionality, should be taken as an example only and not to limit the scope of the disclosure.

Users 46, 48, 50, 52 may access computing device 12 and cognitive fashion product advertising process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Cognitive fashion product advertising process 10 may include one or more user interfaces, such as browsers and textual or graphical user interfaces, through which users 46, 48, 50, 52 may access cognitive fashion product advertising process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, cognitive fashion product advertising process 10 may interact with and/or communicate with one or more of a demand-side platform (e.g., demand-side platform 66) and a supply-side platform (e.g., supply-side platform 68). A demand-side platform may generally include a system that allows buyers of digital advertising inventory to manage multiple advertisement exchange and data exchange accounts through one interface. As will be discussed in greater detail below and in some embodiments, cognitive fashion product advertising process 10 may receive information associated with an advertising opportunity on the first website from the demand-side platform (e.g., demand-side platform 66) and/or may provide one or more bids to the demand-side platform (e.g., demand-side platform 66) for bidding on the advertising opportunity on the first website (e.g., bids associated with digital advertisements to occupy advertising space on first website). In this way, cognitive fashion product advertising process 10 may interact with and/or communicate with demand-side platforms (e.g., demand-side platform 66) to provide cognitive and visual analytics to provide digital advertisements of relevant fashion products for rendering and/or to provide bids for digital advertisements of relevant fashion products via a demand-side platform (e.g., demand-side platform 66). A supply-side platform (e.g., supply-side platform 68) may generally include a technology platform to enable web publishers to manage advertising space inventory and opportunities, fill the advertising space inventory with digital advertisements, and receive revenue. As will be discussed in greater detail below and in some embodiments, cognitive fashion product advertising process 10 may receive information associated with an advertising opportunity on the first website from the supply-side platform (e.g., supply-side platform 68) and/or may provide one or more bids to the supply-side platform (e.g., supply-side platform 68) for bidding on the advertising opportunity on the first website.

While the demand-side platform 66 and supply-side platform 68 as represented in FIG. 1 as being associated with computing device 12, demand-side platform 66 and supply-side platform 68 may be on separate computing devices communicatively coupled via networks 14, 18.

As discussed above and referring also at least to FIGS. 2-9, cognitive fashion product advertising process 10 may identify 200 an advertising opportunity on a first website in response to a user accessing the first website. Information associated with the user accessing the first website may be received 202. One or more digital advertisements of one or more fashion products from a second website may be provided 204 for rendering on the first website based upon, at least in part, one or more fashion-ability scores representative of the one or more fashion products on the second website and the information associated with the user accessing the first website.

In some embodiments consistent with the present disclosure, systems and methods may be provided for rendering one or more digital advertisements, on a first website accessed by a user, for fashion products from a second website based upon, at least in part, one or more fashion-ability scores representative of one or more fashion products available on the second website and the information associated with the user accessing the first website. In this way, cognitive fashion product advertising process 10 may provide digital advertisements for rendering on a first website accessed by a user for relevant fashion products of a second website, based upon, at least in part, the "fashion taste" of the individual. For example, users may access online shopping applications or websites to search for and/or to purchase fashion products. Fashion products, in particular, may be time-variant because a user's fashion taste may change over time. For example, a user's interest in a particular fashion product may change in response to social trends, fashion trends, demographic changes, socio-economic changes, etc. When accessing a website with one or more fashion products, a user may view various fashion products and may select certain fashion products on the website to see various images and variations of the particular fashion product. Additionally, a user may select certain fashion products to place in a "shopping cart" or "wish list" for subsequent purchasing or viewing. Fashion products may include, but are not limited to, on or more of articles of clothing (e.g., shirts, pants, dresses, shorts, jackets, etc.), clothing accessories (e.g., shoes, socks, belts, hats, scarfs, etc.), jewelry (e.g., necklaces, earrings, bracelets, watches, pins, etc.), and the like.

During a user's interaction with the fashion product website, a user may navigate away without purchasing any of the fashion products the user has viewed, added to the wish list, and/or added to the shopping cart. As the user navigates away from the fashion product website, opportunities for digital advertising on the website (e.g. another website) the user is currently viewing may be identified. In some embodiments and as will be discussed in greater detail below, cognitive fashion product advertising process 10 may provide one or more digital advertisements of one or more fashion products on the website the user is accessing for rendering based upon, at least in part, one or more fashion-ability scores representative of one or more fashion products available on the website and the information associated with the user accessing another website. In contrast to conventional advertising and marketing systems, cognitive fashion product advertising process 10 may respond to the user's fashion taste and price perception to provide digital advertisements for rendering on a different website with or without purchasing incentives to entice the user to purchase a fashion product.

As will be discussed in greater detail below and in some embodiments, cognitive fashion product advertising process 10 may "model" a user's fashion taste to provide the one or more digital advertisements for rendering on the first website (e.g., a website other than the website with the fashion products), the digital advertisements including one or more fashion products based upon, at least in part, cognitive and visual analytics associated with the user's interaction with the website. For example, in eCommerce, the image of a fashion product on a website may represent the only interface between the user and the fashion product and may be used to determine what the user is looking for and what the user's fashion taste is. As will be discussed in greater detail below and in some embodiments, cognitive fashion product advertising process 10 may provide one or more digital advertisements for rendering on a first website accessed by a user for one or more fashion products from a second website based upon one or more fashion-ability scores representative of the one or more fashion products. In some embodiments and as will be discussed in greater detail below, a fashion-ability score may be a numerical representation of a fashion product defined for one or more attributes associated with the one or more fashion products. These fashion-ability scores may be generated by processing the image(s) of one or more fashion products using a neural network and by training the neural network with one or more attributes associated with the fashion product. By using fashion-ability scores to provide rendered digital advertisements for fashion products, cognitive fashion product advertising process 10 may provide digital advertisements that more accurately reflect a user's fashion taste using artificial intelligence systems and algorithms. For example, traditional advertisement and marketing systems are typically not able to use artificial intelligence systems to model a user's fashion taste to determine which fashion products to use in marketing campaigns targeted at specific users based upon, at least in part, one or more fashion-ability scores representative of one or more fashion products. In some embodiments, cognitive fashion product advertising process 10 may update or revise which digital advertisements are presented to the user on the first website in response to which digital advertisements the user selects.

Figure 3:
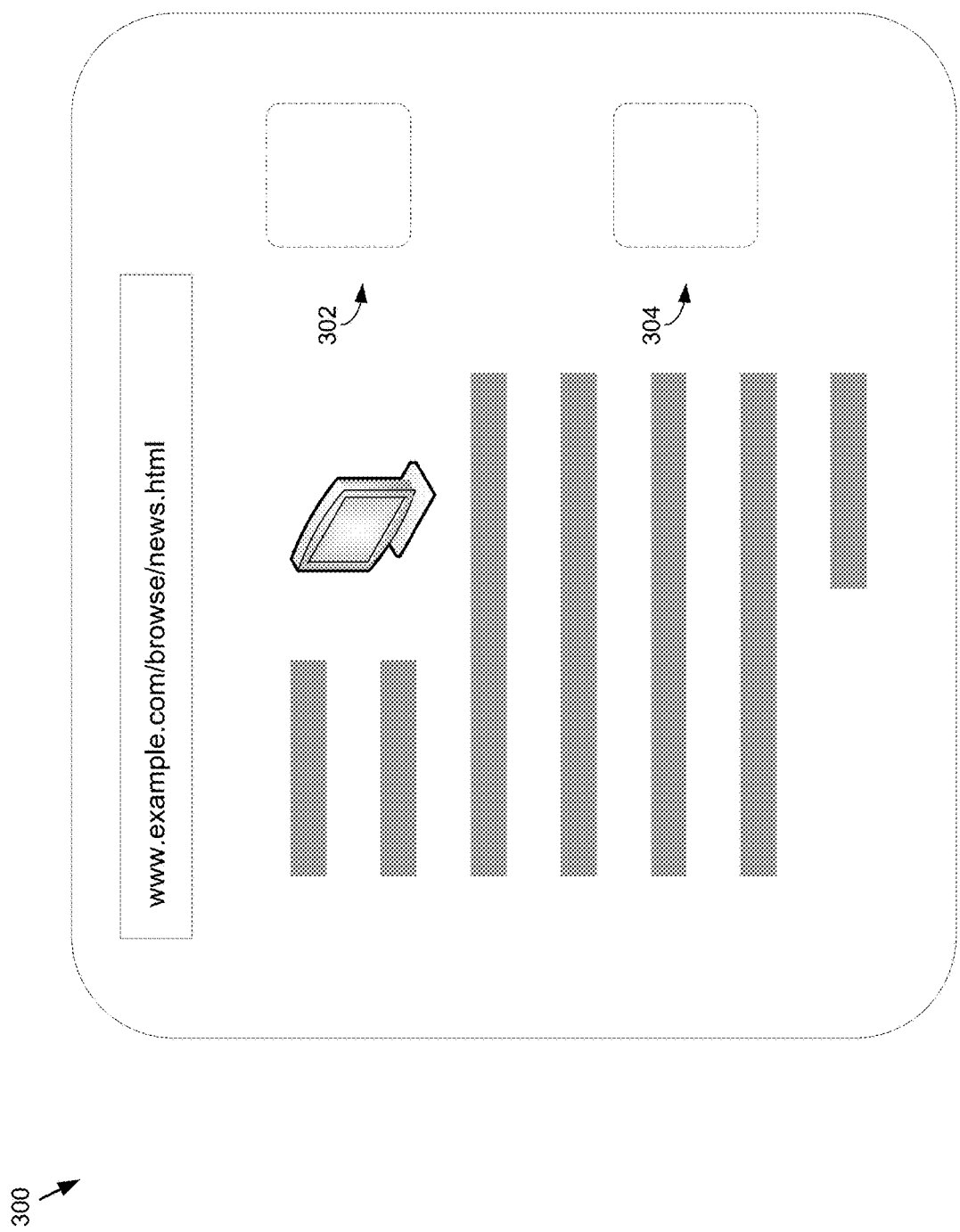
FIG. 3 is an example diagrammatic view of a first eCommerce platform accessed by a user according to one or more example embodiments of the disclosure.
Figure 4:
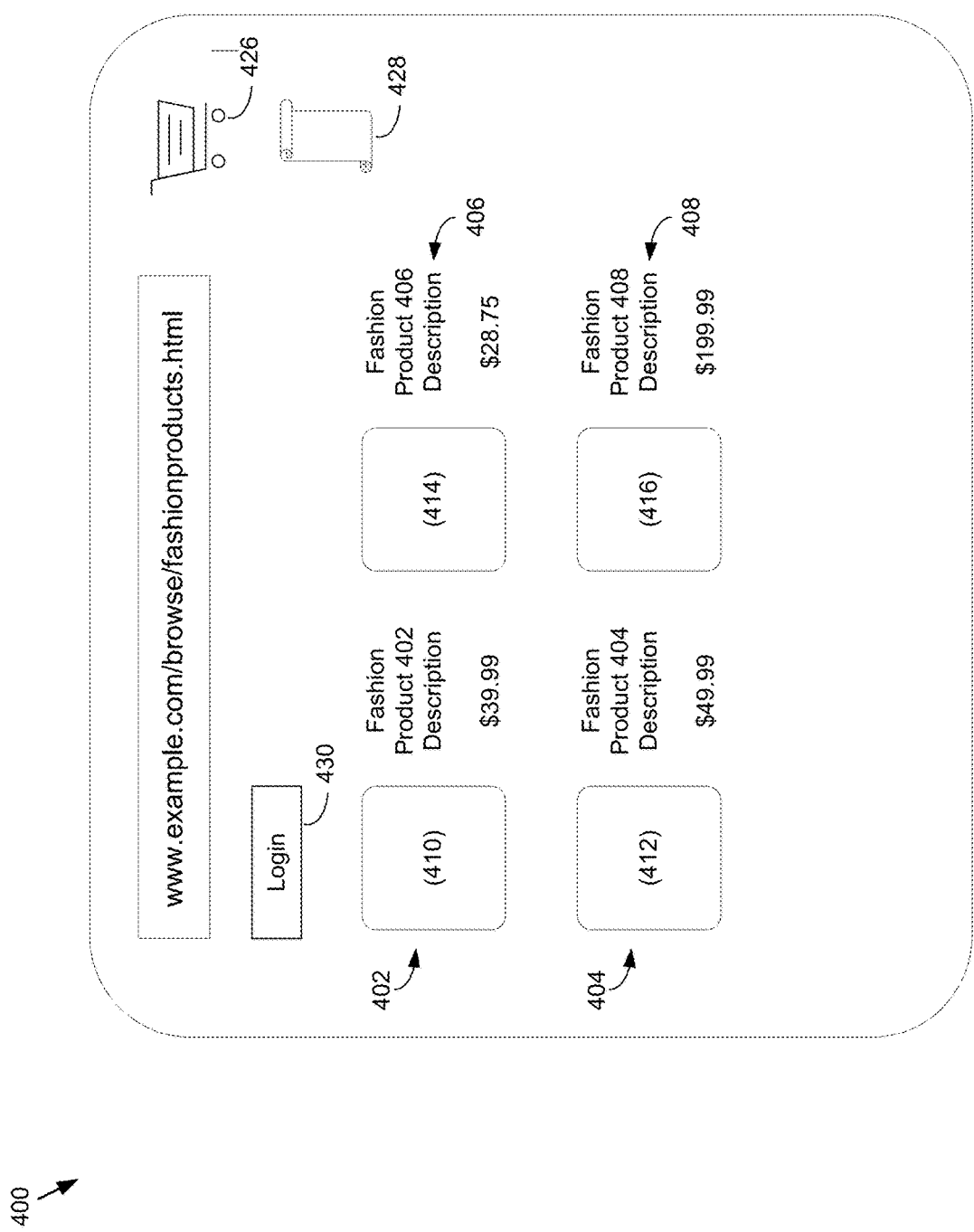
FIG. 4 is an example diagrammatic view of a second eCommerce platform with one or more fashion products according to one or more example embodiments of the disclosure.

As generally discussed above with reference to FIG. 2, cognitive fashion product advertising process 10 may identify 200 an advertising opportunity on a first website in response to a user accessing the first website. Referring also to FIGS. 1 and 3, suppose a user (e.g., user 46) accesses a website (e.g., website 300). When the browser of the computing device (e.g., computing device 38) requests the website (e.g., one or more webpages of the website 300), cognitive fashion product advertising process 10 may send a request to the website's publisher server (e.g., a publisher content server, not shown) to provide the website (e.g., website 300) to the user's browser. In some embodiments, cognitive fashion product advertising process 10 may identify an advertising space (e.g., advertising spaces 302, 304) on the website provided to the user's computing device (e.g., computing device 38) and may send a request for one or more digital advertisements to render in the advertising space (e.g., advertising spaces 302, 304). In some embodiments and as will be discussed in greater detail below, cognitive fashion product advertising process 10 may collect and/or receive 202 information associated with the user accessing the website (e.g., website 300) and provide this information to a supply-side platform (e.g., supply-side platform 68) to request one or more digital advertisements to render in the advertising space (e.g., advertising spaces 302, 304) on the website (e.g., website 300).

In some embodiments, the supply-side platform may process the information associated with the user to collect additional information associated with the user (e.g., location, demographic, age, etc.). In some embodiments, cognitive fashion product advertising process 10 may provide this information from the supply-side platform to a digital advertisement exchange. The digital advertisement exchange may be in communication with one or more demand-side platforms, online advertising networks, and/or other digital advertising exchanges. With this information, cognitive fashion product advertising process 10 may send a bid request to one or more demand-side platforms (e.g., from the digital advertisement exchange) to request bids for the advertising opportunity on the website (e.g., website 300). This may generally be referred to as "Real Time Bidding". In some embodiments, cognitive fashion product advertising process 10 (e.g., via the demand-side platform) may process this information associated with the user accessing the website (e.g., website 300) to provide one or more bids to the supply-side platform (e.g., supply-side platform 68) based upon, at least in part, one or more fashion-ability scores representative of one or more fashion products available on the website and the information associated with the user accessing the website (e.g., website 300). The winning bidder (e.g., via cognitive fashion product advertising process 10) may send or otherwise provide a link to the browser of the computing device (e.g. computing device 38) to render one or more digital advertisements on the website (e.g., website 300) for display on the computing device (e.g., computing device 38) of the user. In some embodiments, the entire process, beginning when the user accesses the website (e.g., opening the website on a browser) to the rendering of one or more digital advertisements of one or more fashion products, may take one second, less than one second, and/or a fraction of a second.

In some embodiments, information associated with the user accessing the first website may be received 202. For example, to increase the efficacy of the digital advertisements provided by cognitive fashion product advertising process 10, cognitive fashion product advertising process 10 may collect and/or receive 202 information associated with the first user accessing the website. For example, cognitive fashion product advertising process 10 may directly collect information associated with the first user and/or may receive information associated with the first user that may be collected by a different process and/or a third party. Examples of information associated with the user may generally include a user's location, a user profile; demographics of the user; a user's browsing history; a user's fashion product reviews, feedback, and/or ratings; etc.

In some embodiments, cognitive fashion product advertising process 10 may receive other information related to advertising and/or marketing objectives. For example, information received by cognitive fashion product advertising process 10 may generally include data for marketing campaigns along with the underlying product/sub-category in the campaign and marketing objective (e.g., increase user revisit, increase sales, increase customer base, increase profits, optimize bids etc.); a campaign budget; a bid range; duration and (optionally) targeted customer profiles; historical ad-bids price for each customer (e.g., based on a customer information identifier and/or unique identifier (e.g., cookie 64)); historical ad-bids prices for different products/campaigns (e.g., based on a product/campaign identifier); historical ad-bids price for different publisher/intermediary sources; and corresponding success related to previous advertising or marketing campaigns (e.g., did the user click on advertisement, visit the website, visit the website and add the advertised fashion product to a shopping cart, visit the website and purchase the advertised fashion product, visit the website and add a different fashion product to a shopping cart, visit the website and purchase a different fashion product, advertisement not clicked, bid not succeeded and product not placed, bid timed out and advertisement not placed, other error).

In some embodiments, receiving 202 information associated with the user accessing the first website may include determining if the user is one or more of a customer of the second website or a non-customer of the second website. A customer may generally include a user who views and purchases products from an eCommerce platform. For example, a user (e.g., user 46) may access a website with one or more fashion products (e.g., website 400). In some embodiments, the website (e.g., website 400) may be an eCommerce platform/portal configured to facilitate the online purchases of one or more fashion products. In some embodiments, the one or more fashion products may be available for viewing on the website and/or purchasing via the website. In some embodiments, the website (e.g., website 400) may include one or more fashion products (e.g., fashion products 402, 404, 406, 408). On the website (e.g., website 400), the one or more fashion products (e.g., fashion products 402, 404, 406, 408) may be represented by images (e.g., fashion product images 410, 412, 414, 416) of the one or more fashion products rendered on a webpage of the website. While an example including four fashion products has been described, it will be appreciated that any number of fashion products are possible within the scope of the present disclosure.

In some embodiments, a webpage of the website (e.g., website 400) may include one or more images of the one or more fashion products (e.g., fashion product images 410, 412, 414, 416) and one or more descriptions associated with the one or more fashion products. In some embodiments, the website (e.g., website 400) may include user-selectable buttons (e.g., shopping cart button and wish list button) to add a fashion product to a "shopping cart" (e.g., shopping cart 426) and/or a "wish list" (wish list 428) on the website (e.g., website 400). In some embodiments, the shopping cart (e.g., shopping cart 426) may be a digital representation of a physical shopping cart that may be used to identify which fashion products the user would like to purchase. The shopping cart (e.g., shopping cart 426) may include a data structure configured to store the one or more fashion products (e.g., links to webpages and/or portions of the website associated with the fashion product) selected by the user for purchase. In some embodiments, the wish list (e.g., wish list

428) may be a list used for identifying which fashion products the user would like to remember and/or potentially purchase. The wish list (e.g., wish list 428) may include a data structure configured to store the one or more fashion products (e.g., links to webpages and/or portions of the website associated with the fashion product) selected by the user for future consideration.

In some embodiments, the website (e.g., website 400) may include user-selectable links to other webpages or other eCommerce platforms and/or portals for the one or more fashion products. For example, a user (e.g., user 46) may access website (e.g., website 400) via a browser of a computing device (e.g., computing device 38). The user (e.g., user 46) may select an image of a fashion product (e.g., fashion product 402) on a first webpage of the website (e.g., website 400) or some other user-selectable link associated with a fashion product (e.g., fashion product 402). In response to selecting the image of fashion product (e.g., fashion product 402), or other user-selectable link associated with the fashion product, the browser may navigate the user (e.g., user 46) to a second webpage (not shown) of the website, where the user (e.g., user 46) may be shown various images of the selected fashion product (e.g., fashion product image 410) and/or a description of the fashion product. While an example including two webpages of a website has been discussed, it will be appreciated that any number of webpages are possible within the scope of the present disclosure.

In some embodiments, while browsing the website (e.g., website 400), cognitive fashion product advertising process 10 may provide one or more cookies (e.g., cookie 64), or other storage mechanisms, to store a unique identifier and a record of webpages of the website the user (e.g., user 46) has accessed. In some embodiments, the unique identifier may be used to associate a browser with a record of webpages of the website the user has accessed. In some embodiments, the one or more unique identifiers (e.g., cookie 64) may indicate which fashion products have been added to the shopping cart (e.g., shopping cart 426) and/or the wish list (e.g., wish list 428). Cognitive fashion product advertising process 10 may request and collect the one or more unique identifiers (e.g., cookie 64) from the browser of the computing device (e.g., computing device 38) associated with the user and may process the one or more unique identifiers (e.g., cookie 64) to determine which fashion products the user has viewed, selected, searched for, added to the shopping cart (e.g., shopping cart 424), added to the wish list (e.g., wish list 428), purchased from the website, etc. While cookies have been described as an example storage mechanism used in storing and processing a user's browsing history, it will be appreciated that other storage mechanisms are possible and are within the scope of the present disclosure.

In some embodiments, while navigating the second website, a user may provide login information associated with a user account. For example, the second website (e.g., website 400) may provide user account services to enable a user to create an account on the website (e.g., via login accessibility button 430). When a user is logged into his or her account on the website, cognitive fashion product advertising process 10 may record or otherwise monitor the user's browsing history to determine which fashion products the user views, selects, searches for, adds to the shopping cart (e.g., shopping cart 426), adds to the wish list (e.g., wish list 428), and/or purchases from the website.

In some embodiments, cognitive fashion product advertising process 10 may receive 202 information associated with the user accessing the first website to determine if the user is one or more of a customer of the second website or a non-customer of the second website. As will be discussed in greater detail below, cognitive fashion product advertising process 10 may provide more relevant digital advertisements to a customer than a non-customer by processing a customer's browsing and purchase history to model the user's fashion taste and price perception of fashion products. Returning to the above example, suppose user 46 navigates away from the second website (e.g., website 400) and navigates to another website (e.g., a website 300). In this example, and in response to user 46 accessing a first website (e.g., website 300) with an identified 200 advertising opportunity, cognitive fashion product advertising process 10 may determine whether user 46 is a previous customer of second website 400. In some embodiments, cognitive fashion product advertising process 10 may determine whether a user accessing the first website is a previous customer by collecting one or more unique identifiers (e.g., cookie 64 or other storage mechanism) from the browser and/or the computing device associated with the user. For example, cognitive fashion product advertising process 10 may process the one or more unique identifiers (e.g., cookie 64) to determine that user 46 has accessed the second website previously. As such, cognitive fashion product advertising process 10 may determine that user 46 is a previous customer of the second website. As will be discussed in greater detail below, cognitive fashion product advertising process 10 may use the browsing and/or purchase history of the previous customer on the second website to provide the one or more digital advertisements for rendering on the first website.

Figure 5:
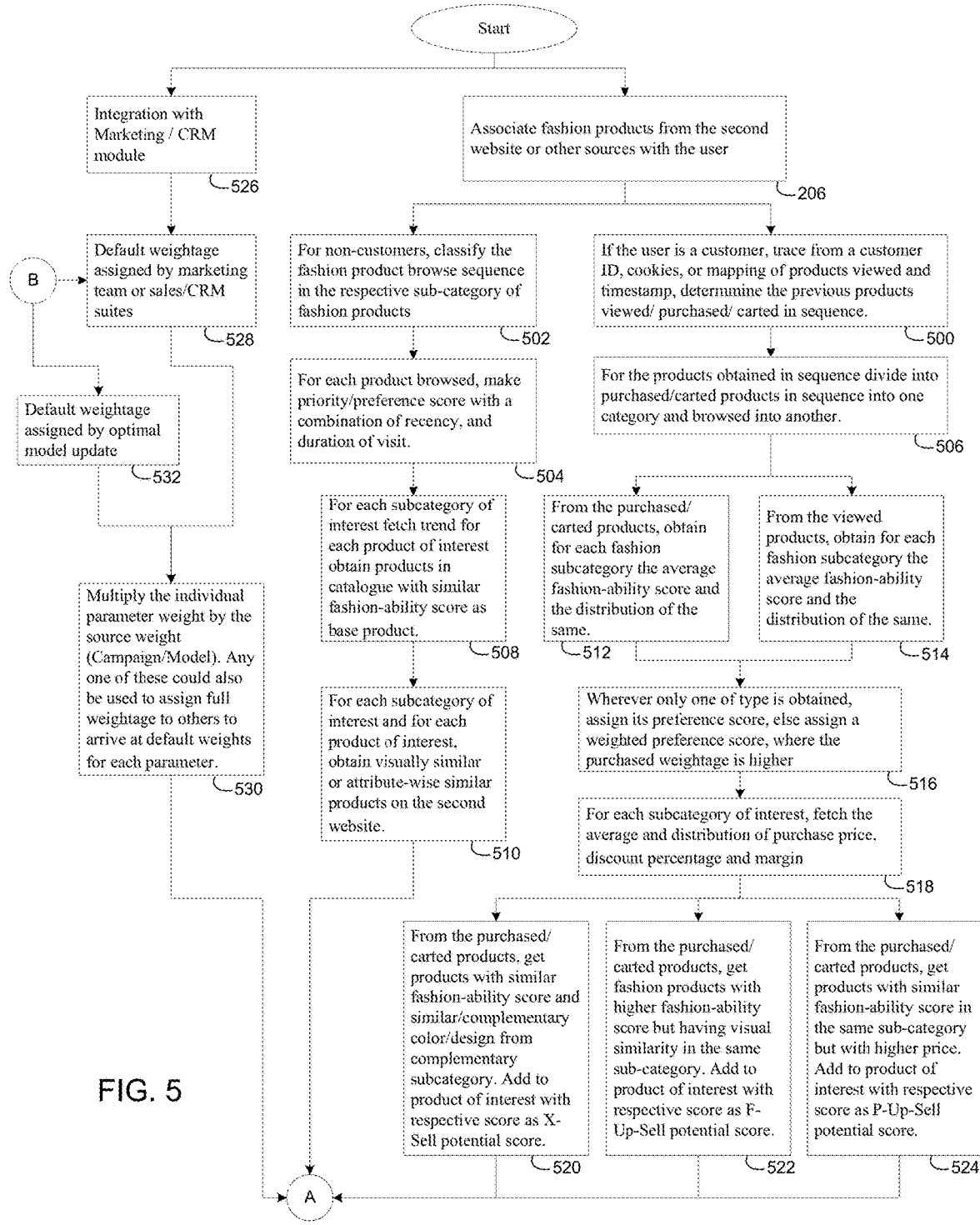
FIGS. 5-6 are example flowcharts of the cognitive fashion product advertising process according to one or more example embodiments of the disclosure.

Referring also to FIG. 5 and in some embodiments, cognitive fashion product advertising process 10 may determine 500 the previous fashion products viewed, fashion products purchased, and/or fashion products added to a shopping cart (e.g., carted) in sequence with a timestamp when cognitive fashion product advertising process 10 determines that the user is a customer of the second website.

In some embodiments, receiving 202 information associated with the user accessing the first website may include associating 206 one or more fashion products with the user accessing the first website. For example and in some embodiments, cognitive fashion product advertising process 10 may associate 206 one or more fashion products with a user accessing the first website by processing a user's browsing history. For example, while browsing various websites for one or more fashion products, a user (e.g., user 46) may generate a browsing history on the browser of the computing device associated with the user. In some embodiments, the browsing history of the website may include a user's session and/or navigation history on each website, which may include, but is not limited to, what fashion product the user has viewed, which category and/or sub-category of fashion-products have been viewed by the user and in what sequence, which fashion products have been added to or removed from the wish list (e.g., wish list 428) on the second website, which products have been added to or removed from the shopping cart (e.g., shopping cart 426) on the second website, which products have been purchased, etc. In some embodiments, this browsing history may be stored in a unique identifier (e.g., cookie 64) on the computing device associated with a user.

In some embodiments and as discussed above, cognitive fashion product advertising process 10 may receive 202 additional information associated with the user (e.g., from a supply-side platform 68) which may include browsing and/or purchase history of one or more fashion products from various sources (e.g., external to unique identifiers stored on the computing device). For example, a supply-side platform (e.g., supply-side platform 68) may include or identify a user's purchase history from another website. In some embodiments, cognitive fashion product advertising process 10 may associate 206 these one or more fashion products with the user.

In some embodiments, cognitive fashion product advertising process 10 may process a user's browsing history of the second website from the computing device of the user to determine a fashion product browsing sequence. In some embodiments, the fashion product browsing sequence may include a sequence of one or more fashion products viewed by the customer, one or more fashion products added to the shopping cart (e.g., shopping cart 426) by the customer, and/or one or more fashion products purchased by the customer.

In some embodiments where the user is not a customer (e.g., user is a non-customer), cognitive fashion product advertising process 10 may classify 502 or define the fashion product browse sequence for each respective sub-category of fashion products. For example, cognitive fashion product advertising process 10 may classify a browsing sequence for each sub-category of fashion (e.g., a browsing sequence associated with e.g., shirts browsed by the user and/or a browsing sequence associated with e.g., dresses browsed by the user). In some embodiments, cognitive fashion product advertising process 10 may define 504 a priority or preference score for each fashion product browsed based upon, at least in part, how recently a user viewed the fashion product and the duration of the user's viewing of the fashion product. For example, fashion products viewed more recently may receive a higher priority or preference which fashion products that were viewed less recently may receive a lower priority or preference.

In some embodiments, cognitive fashion product advertising process 10 may divide 506 the fashion product browsing sequence into a first group including fashion products added to the shopping cart and fashion products purchased and a second group including fashion products viewed by the customer. While two groups have been discussed, it will be appreciated that the fashion product browsing sequence may be divided into any number of groups within the scope of the present disclosure. As will be discussed in greater detail below and in some embodiments, the fashion browsing sequence may provide a ranking or priority by which cognitive fashion product advertising process 10 provides digital advertisements for one or more fashion products on the website.

In some embodiments, cognitive fashion product advertising process 10 may associate 206 one or more fashion products with the user accessing the first website based upon, at least in part, one or more other users of the website. For example, cognitive fashion product advertising process 10 may identify similar existing or new customers and match their fashion-ability scores for fashion products the other customers are associated with (e.g., within a predefined threshold) to provide 204 one or more digital advertisements for fashion products, categories of fashion products, and/or sub-categories of fashion products to the user. For example, a new customer may access the first website (e.g., website 300) and cognitive fashion product advertising process 10 may determine (e.g., as discussed above) that the user is not a previous customer of the second website (e.g., second website 400). Cognitive fashion product advertising process 10 may receive 202 information associated with the user accessing the first website to identify other users of the website with similar characteristics (e.g., age, location, social media activity, demographics, browsing and/or purchase history, etc.). As such, cognitive fashion product advertising process 10 may provide 204 one or more digital advertisements for one or more fashion products with similar fashion-ability scores to fashion products browsed and/or purchased by similar existing or new customers.

In some embodiments, cognitive fashion product advertising process 10 may provide 204 one or more digital advertisements of one or more fashion products from a second website for rendering on the first website based upon, at least in part, one or more fashion-ability scores representative of the one or more fashion products on the second website and the information associated with the user accessing the first website. In some embodiments, a fashion-ability score may be a numerical representation of a fashion product defined for one or more attributes associated with the one or more fashion products. Cognitive fashion product advertising process 10 may generate one or more fashion-ability scores representative of one or more fashion products. In some embodiments, generating the one or more fashion-ability scores representative of the one or more fashion products based upon, at least in part, processing one or more images of the one or more fashion products.

Figure 7:
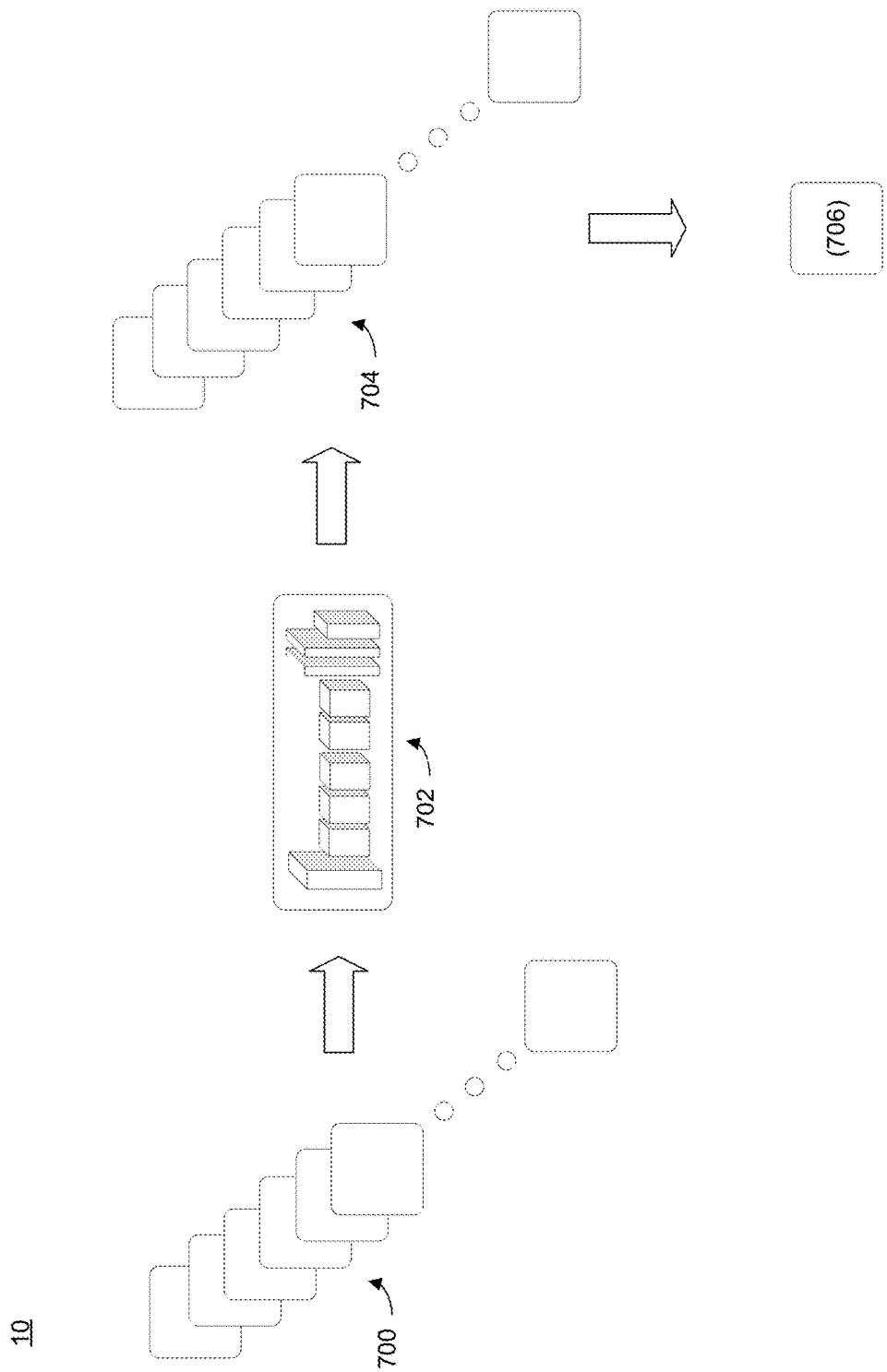
FIG. 7 is an example diagrammatic view of the processing of images to generate one or more fashion-ability tensors and the generation of one or more fashion-ability scores representative of one or more fashion products according to one or more example embodiments of the disclosure.

For example and referring also to FIG. 7, cognitive fashion product advertising process 10 may receive one or more images of one or more fashion products (e.g., images 700). The one or more images (e.g., images 700) may be digital representations displayed on a user interface and/or may be physical photographs or reproduction of photographs. In some embodiments, cognitive fashion product advertising process 10 may receive the plurality of images (e.g., images 700) via a camera system. Additionally, the one or more images of the one or more fashion products (e.g., images 700) may be received from a computing device (e.g., client electronic devices 38, 40, 42, 44 (and/or computing device 12)). It will be appreciated that the one or more images of the one or more fashion products (e.g., images 700) may be received in various ways within the scope of the present disclosure. In some embodiments, the one or more images (e.g., images 700) may be stored in a repository or other database for processing.

In some embodiments, cognitive fashion product advertising process 10 may receive metadata associated with the one or more images. For example, for each image, cognitive fashion product advertising process 10 may receive metadata corresponding to different characteristics or attributes of the one or more images of the one or more fashion products. In some embodiments, metadata may be visual or non-visual (e.g., tags, features extracted from description, brand, color, price, price history, discounts, etc.) Examples of the metadata associated with the one or more images may include, but is not limited to, categories of the one or more fashion products, materials of the one or more fashion products, patterns of the one or more fashion products, age groups associated with the one or more fashion products, gender associated with the one or more fashion products, price associated with the one or more fashion products, the trendiness of the one or more fashion products, the highest year trending of the one or more fashion products, the number of social media likes associated with the one or more fashion products, survey responses associated with one or more fashion products, etc. As will be discussed in greater detail below, the metadata associated with the one or more images may be used as a training classification or attribute when processing the one or more images by cognitive fashion product advertising process 10. In some embodiments, the metadata may be categorical (e.g., movies or television programs in which this fashion product appeared), continuous (e.g., price of fashion product), and/or a combination of categorical and continuous (e.g., price perception by age).

In some embodiments, cognitive fashion product advertising process 10 may define one or more categories associated with the one or more fashion products based upon, at least in part, the one or more images (e.g., images 700) and the metadata associated with the one or more images. For example, cognitive fashion product advertising process 10 may define categories associated with the one or more fashion products to include categories such as outerwear, innerwear, coats, jackets, hats, scarves, dresses, shoes, socks, shirts, blouses, pants, skirts, ties, suits, etc. based upon the one or more images and the metadata associated with the one or more images. While several possible categories for the one or more fashion products have been provided, it will be appreciated that other categories are possible within the scope of the present disclosure. In some embodiments, cognitive fashion product advertising process 10 may define one or more sub-categories for the one or more categories. For example, cognitive fashion product advertising process 10 may define sub-categories associated with the category the "shirts" category to include men's shirts, women's shirts, boy's shirts, girl's shirts, t-shirts, novelty t-shirts, long-sleeve shirts, sleeveless shirts, workout shirts, swimming shirts, etc. While several possible sub-categories for the "shirts" category have been provided, it will be appreciated that other sub-categories are possible within the scope of the present disclosure for various categories defined for the one or more fashion products.

Referring again to FIG. 5 and in some embodiments, cognitive fashion product advertising process 10 may process the one or more of images of the one or more fashion products (e.g., images 700) to generate one or more fashion-ability tensors. In some embodiments, cognitive fashion product advertising process 10 may process the one or more images (e.g., images 700) using a neural network. For example, cognitive fashion product advertising process 10 may receive the one or more images (e.g., images 700) and may process the one or more images via a neural network (e.g., neural network 702). A neural network may generally include a computing system that "learns" to do tasks by processing examples. In some embodiments, a neural network is able to differentiate images from one another by analyzing a plurality of example images across one or more attributes. From this "training" with pre-identified images, a neural network (e.g., neural network 702) is able to generally identify a similar image and/or differentiate an image against other images for a given attribute or dimension. For example and as discussed above, metadata associated with the one or more images may be used as attributes or dimensions to train the one or more images on the neural network (e.g., neural network 402) of cognitive fashion product advertising process 10. Additional details regarding neural networks are described, for example, in Sewak, M., Md, Karim, R., & Pujaru, P. (2018). *Practical Convolutional Neural Networks*. (pp. 91-113). Birmingham, UK: Packt Publishing., which is incorporated herein by reference.

In some embodiments, processing the one or more images of the one or more fashion products may include selecting one or more images to process via the neural network (e.g., neural network 702). For example, cognitive fashion product advertising process 10 may receive some training data (e.g., one or more images of the one or more fashion products) and test and validation data (e.g., one or more examples images of one or more fashion products). In some embodiments, the selection of which images to process may be automatic and/or may be defined manually by a user (e.g., using a user interface). In some embodiments, the selection of training data may be based upon, at least in part, the one or more categories and/or one or more sub-categories defined for the one or more fashion products shown in the one or more images. For example, certain models or types of neural network (e.g., neural network 702) may perform better (e.g., more discrete classification of images) for certain categories and/or sub-categories of fashion products. In experiments conducted by the Applicant, the model architecture or type of neural network (e.g., neural network 702) that may best define fashion-ability scores for different categories and/or different sub-categories of fashion products may differ and hence one-size or one neural network model may not fit all categories and/or sub-categories of fashion products. In some embodiments, cognitive fashion product advertising process 10 may provide the flexibility to cognitively identify and select the right artificial-intelligence methodology/topology/neural network (e.g., neural network 702) to process the one or more images of a particular category and/or sub-category of fashion product to generate the one or more fashion-ability scores.

In some embodiments, cognitive fashion product advertising process 10 may include a repository or other data structure including one or more model architectures or types of neural networks (e.g., neural network 702) to process the one or more images of the one or more fashion products (e.g., images 700). Examples of models or types of neural networks may generally include VGG16 Model Architecture, GoogLeNet, LeNet, ResNet, Inception, Xception, etc. It will be appreciated that various models or types of neural networks (e.g., neural network 702) may be used within the scope of the present disclosure. For example, any neural network or other model architecture configured for deep learning may be used within the scope of the present disclosure to process the one or more images of the one or more fashion products.

In some embodiments, cognitive fashion product advertising process 10 may select a model architecture or type of neural network (e.g., neural network 702) based upon, at least in part, the one or more categories and/or sub-categories of the one or more images of the one or more fashion products (e.g., images 700). In some embodiments, a model may be trained for each category and/or each sub-category. In some embodiments, cognitive fashion product advertising process 10 may select one or more attributes to train the neural network (e.g., neural network 702) with. For example, a neural network (e.g., neural network 702) may be trained to differentiate one or more images from a particular category or sub-category across the selected attribute. An attribute selected for training a neural network may also be referred to as a dimension. Cognitive fashion product advertising process 10 may train the selected model or type of neural network (e.g., neural network 702) with the one or more images of the one or more fashion products across the selected attribute. In some embodiments, cognitive fashion product advertising process 10 may store the trained neural network in a repository or other data structure.

In some embodiments, cognitive fashion product advertising process 10 may generate one or more fashion-ability tensors (e.g., fashion-ability tensors 704) representative of the one or more fashion products for various models or types of neural networks. For example, cognitive fashion product advertising process 10 may retrieve each trained neural network and score each of the one or more images against every attribute or dimension that the neural network is trained for. In some embodiments, the scoring of each image may generate one or more scored vectors, where each vector corresponds to a particular attribute used to train the neural network. Cognitive fashion product advertising process 10 may join each of the scored vectors for a particular fashion product or image of the fashion product to form a multi-dimensional vector or fashion-ability tensor (e.g., fashion-ability tensors 704) corresponding to the visual representation of the fashion product.

In some embodiments, cognitive fashion product advertising process 10 may generate the one or more fashion-ability scores representative of the one or more fashion products by selecting an attribute or dimension for generating a fashion-ability score and retrieving the vector trained for the selected attribute from the fashion-ability tensor for the fashion product (e.g., fashion-ability tensors 704). In response to retrieving the vector trained for the selected attribute from the fashion-ability tensor for the fashion product (e.g., fashion-ability tensors 704), cognitive fashion product advertising process 10 may produce a fashion-ability score (e.g., fashion-ability score 706) that represents a fashion product for the selected dimension. For example, cognitive fashion product advertising process 10 may select one or more attributes to define a fashion-ability score (e.g., fashion-ability score 706) for (e.g., trendiness of a fashion product for a given age-group). Cognitive fashion product advertising process 10 may retrieve the vector from the fashion-ability tensor (e.g., fashion-ability tensors 704) for e.g., trendiness for a given age group to generate the one or more fashion-ability scores (e.g., fashion-ability score 706) representative of the one or more fashion products for the selected attribute of e.g., trendiness of a fashion product for a given age-group. In some embodiments, the generated fashion-ability score for the one or more fashion products (e.g., fashion-ability score 706) may represent the e.g., trendiness of a fashion product for a given age-group as a score. For example and in some embodiments, a higher fashion-ability score (e.g., fashion-ability score 706) may indicate that a particular fashion product is e.g., more trendy among a given age-group and a lower fashion-ability score (e.g., fashion-ability score 706) may indicate that a particular fashion product is e.g., less trendy among the given age-group. While the example attribute of "trendiness of a fashion product for a given age-group" has been discussed, it will be appreciated that various attributes or combinations of attributes may be used to generate fashion-ability scores within the scope of the present disclosure.

As will be discussed in greater detail below, cognitive fashion product advertising process 10 may provide 204 one or more digital advertisements of one or more fashion products from a second website for rendering on the first website based upon, at least in part, one or more fashion-ability scores representative of the one or more fashion products on the second website and the information associated with the user accessing the first website. As discussed above, the one or more fashion-ability scores (e.g., fashion-ability score 706) may be generated from fashion-ability tensors generated for each fashion product. As such, providing 204 one or more digital advertisements of one or more fashion products from a second website for rendering on the first website based upon, at least in part, the one or more fashion-ability scores representative of the one or more fashion products may include providing one or more digital advertisements of one or more fashion products from a second website for rendering on the first website based upon, at least in part, the one or more fashion-ability tensors associated with the one or more fashion products. For example, cognitive fashion product advertising process 10 may provide 204 one or more digital advertisements of one or more fashion products from a second website for rendering on the first website based upon, at least in part, one or more fashion-ability scores representative of the one or more fashion products on the second website and the information associated with the user accessing the first website and/or based upon, at least in part, the one or more fashion-ability tensors associated with the one or more fashion products on the second website and the information associated with the user accessing the first website.

In some embodiments, cognitive fashion product advertising process 10 may provide 204 one or more digital advertisements of one or more fashion products from a second website for rendering on the first website based upon, at least in part, one or more fashion-ability scores representative of the one or more fashion products on the second website and the information associated with the user accessing the first website. For example and as discussed above, cognitive fashion product advertising process 10 may process the one or more images of the one or more fashion products on the website to generate a fashion-ability tensor associated with each of the one or more fashion products on the website (e.g., fashion-ability tensors 704). In some embodiments, cognitive fashion product advertising process 10 may process the one or more images of the one or more fashion products associated with the user to generate a fashion-ability tensor associated with each of the one or more fashion products associated with the user (e.g., fashion-ability tensors 704). For example, the one or more fashion products associated with the user may include one or more fashion products that are not included in the fashion-ability tensors associated with the one or more fashion products on the website (e.g., new products, products from a different website, etc.). In some embodiments, the one or more fashion products associated with the user may have fashion-ability tensors that were generated previously (e.g., for fashion products already on the website). As discussed above, from these fashion-ability tensors, cognitive fashion product advertising process 10 may generate the one or more fashion-ability scores representative of the one or more fashion products associated with the user and the one or more fashion products on the website.

In some embodiments, cognitive fashion product advertising process 10 may determine a similarity between one or more fashion products. In some embodiments, cognitive fashion product advertising process 10 may convert an image of a fashion product into pixel intensities across channels (e.g., RGB), may preform dimension reduction to reduce computational load, and then may apply vector similarity formula like (e.g., Cosine Similarity, Pearson Similarity etc.) on the so obtained vector tensors. This may require IN (e.g. square root of N) complexity (e.g., where N is the number of images) as each image is compared with every other image. In some embodiments, cognitive fashion product advertising process 10 may use indexing based approximate similarity algorithms like ANNOY (approximate nearest neighbor) to determine a similarity between one or more fashion products.

In some embodiments, cognitive fashion product advertising process 10 may determine a similarity between one or more fashion products by using one or more layers of a neural network (e.g., neural network 702). For example, in deep learning, one way of determining similarity between images of fashion products is to obtain the flattened layer of the image as obtained from the last fully connected layer of a pre-trained neural network. Additional details regarding this process are described, for example, in Sewak, M., Md, Karim, R., & Pujaru, P. (2018). *Practical Convolutional Neural Networks*. (pp. 103-113). Birmingham, UK: Packt Publishing., which is incorporated herein by reference.

In some embodiments, cognitive fashion product advertising process 10 may determine a similarity between one or more fashion products based upon, at least in part, the one or more fashion-ability tensors (e.g., fashion-ability tensor 704). In some embodiments, instead of a flattened layer from a neural network as discussed above, cognitive fashion product advertising process 10 may use a flattened output of a fashion-ability score and may drive similarities between fashion products from these fashion-ability scores (e.g., fashion-ability score 706) (e.g., using ANNOY or other similarity computation as discussed above). In some embodiments, cognitive fashion product advertising process 10 may use one or more fashion-ability tensors (e.g., fashion-ability tensor 704), which may be flattened and used to determine similarity between one or more fashion products.

Referring again to FIG. 5 and returning to the example where user 46 is not a previous customer of the second website, cognitive fashion product advertising process 10 may fetch 508 or otherwise obtain trend information for each fashion product of the fashion product browsing sequence and may obtain one or more fashion products from the second website with similar fashion-ability scores as discussed above. In some embodiments, cognitive fashion product advertising process 10 may obtain 510, for each fashion product category or sub-category of fashion products, visually similar fashion products from the second website and/or fashion products with similar attributes. For example, suppose a user views a particular pattern of dress but subsequently leaves the second website without purchasing the dress. In some embodiments, cognitive fashion product advertising process 10 may obtain visually similar dresses and/or similar dresses with the same particular pattern.

Returning to the example where user 46 is a previous customer, cognitive fashion product advertising process 10 may obtain 512, for each fashion product category or sub-category of fashion products purchased by the user or added to the shopping cart by the user, the average fashion-ability score and/or the distribution of the fashion-ability score for the fashion products of that category or sub-category. In some embodiments, cognitive fashion product advertising process 10 may obtain 514, for each fashion product category or sub-category of fashion products viewed by the user, the average fashion-ability score and/or the distribution of the fashion-ability score for the fashion products of that category or sub-category. In some embodiments, cognitive fashion product advertising process 10 may assign 516 a weighted priority and/or preference score for purchased and carted fashion products than for viewed fashion products. In some embodiments, cognitive fashion product advertising process 10 may obtain 518 the average purchase price, discount percentage, and/or margin for each fashion product category or sub-category represented by the fashion products associated 206 with the user.

Figure 8:
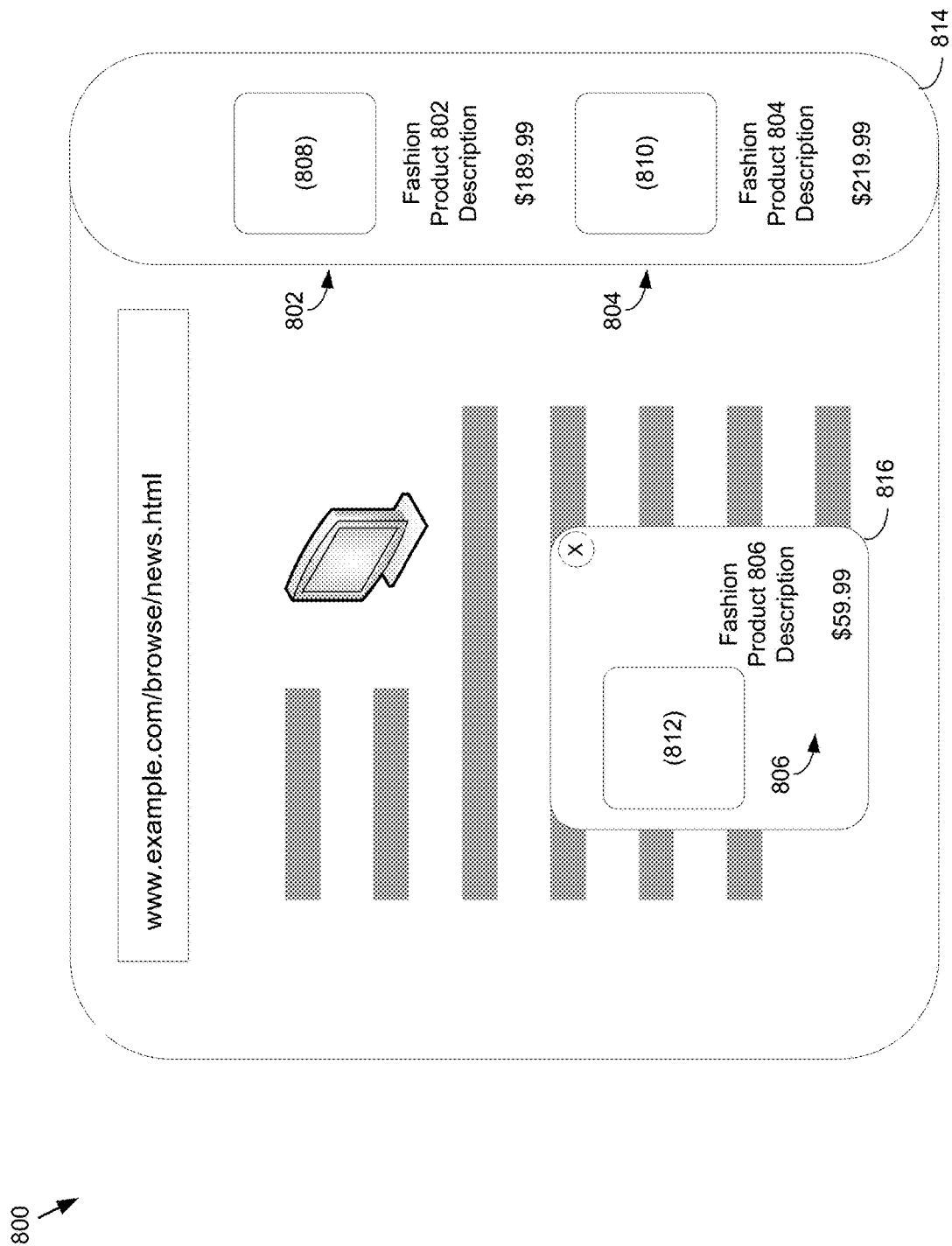
FIG. 8 is an example diagrammatic view of the first eCommerce platform of FIG. 3 with one or more rendered digital advertisements for one or more fashion products according to one or more example embodiments of the disclosure.

In some embodiments, cognitive fashion product advertising process 10 may provide 204 one or more digital advertisements of one or more fashion products from a second website for rendering on the first website based upon, at least in part, one or more fashion-ability scores representative of the one or more fashion products on the second website and the information associated with the user accessing the first website. Referring also to FIG. 8 and in some embodiments, cognitive fashion product advertising process 10 may provide 204 the one or more digital advertisements for one or more fashion products (e.g., digital advertisements 802, 804, 806) for rendering on the website (e.g., website 800). In some embodiments, the one or more digital advertisements may include images of the one or more fashion products (e.g., images 808, 810, 812). While three digital advertisements for three fashion products are shown in FIG. 8, it will be appreciated that any number of digital advertisements are possible within the scope of the present disclosure. For example and as will be discussed in greater detail below, cognitive fashion product advertising process 10 may identify several fashion products to display as digital advertisements to the user based upon, at least in part, the fashion-ability score of the one or more fashion products representative of the one or more fashion products on the second website and the information associated with the user accessing the first website. In some embodiments, cognitive fashion product advertising process 10 may provide a subset of the one or more digital advertisements in a designated window (e.g., advertisement window 814) or portion of the website. In some embodiments, cognitive fashion product advertising process 10 may provide the digital advertisement (e.g., fashion product 806 with image 812) for rendering within a pop-up window (e.g., pop-up advertisement window 816) or other separate window from the first website. Rendering may generally include server-side rendering (i.e., receiving a request for a website from a browser and providing rendered HTML code from the server to the browser for displaying the website on the browser) and/or client-side rendering (i.e., receiving a request for a website from a browser and providing JavaScript to the browser from a server which makes additional requests for content which is used to generate HTML code at the browser). In this manner and in some embodiments, cognitive fashion product advertising process 10 may provide rendered e.g. HTML code including the one or more digital advertisements (e.g., server-side rendering) and/or may provide the one or more digital advertisements as e.g. JavaScript Object Notation (JSON) data in response to a e.g. JavaScript request, which may be used to generate HTML code including the one or more digital advertisements (e.g., client-side rendering). It will be appreciated that the above description of rendering is for example purposes only and that other methodologies for rendering digital advertisements is within the scope of the present disclosure. As used herein and where appropriate, "rendering" and "providing for rendering" may be used interchangeably within the scope of the present disclosure.

In some embodiments, cognitive fashion product advertising process 10 may generate a sequence for rendering the one or more digital advertisements on the first website. For example and as will be discussed in greater detail below, cognitive fashion product advertising process 10 may generate a prioritized sequence of digital advertisements for rendering on the first website.

In some embodiments, cognitive fashion product advertising process 10 may pair 208 the one or more digital advertisements with one or more purchasing incentives based upon, at least in part, the one or more fashion-ability scores representative of the one or more fashion products on the second website. Fashion products have very complex price elasticity distributions, which may significantly change their behavior across different fashion-ability scores. Moreover, price elasticity distribution may not remain constant, but may change dynamically with time or other social conditions, economic conditions, cultural conditions, etc. For example, one fashion product which has a higher fashion-ability score at a given time may assume a price elasticity distribution with negative trend elasticity at that fashion-ability score range, and after some time after the fashion product starts moving from fashion shows to "Page-3 parties", it may assume a flatter distribution, followed by positive distribution by mass adoption. Getting this concept wrong may not only severely harm the revenues and conversion for a retail channel, but may severely impact branding and business viability for specific fashion appeal or fashion products. In some embodiments, cognitive fashion product advertising process 10 may pair 208 the one or more digital advertisements with one or more purchasing incentives based upon, at least in part, the one or more fashion-ability scores representative of the one or more fashion products on the second website.

For example, suppose user 46 has viewed a fashion product (e.g., fashion product 408) during a previous browsing session on the second website (e.g., website 400). Suppose that user 46 navigates away from the second website without purchasing the fashion product (e.g., fashion product 408). Subsequently, user 46 accesses the first website (e.g., website 300). In response to user 46 accessing the first website (e.g., website 300), cognitive fashion product advertising process 10 may identify 200 an advertising opportunity on the first website (e.g., website 300) in the form of e.g., two digital advertisements. As discussed above, cognitive fashion product advertising process 10 may receive 202 information associated with the user (e.g., via cookie 64 on computing device 38, via supply-side platform 68, and other sources). In some embodiments, cognitive fashion product advertising process 10 may associate 206 one or more fashion products (e.g., fashion product 408) with the user (e.g., by processing a browsing history associated with the user). In some embodiments and as discussed above, cognitive fashion product advertising process 10 may generate the one or more fashion-ability scores for the one or more fashion products associated with the user and the one or more fashion products of the second website. In this example, cognitive fashion product advertising process 10 may determine that fashion product 408 is e.g., a luxury pair of socks, that has a positive price elasticity at a given time (e.g., determined by cognitive fashion product advertising process 10 and/or user-specified). As such, cognitive fashion product advertising process 10 may provide an increased price purchase incentive to motivate user 46 to purchase this exclusive pair of socks. For example, user 46 may have doubted the quality or brand of the fashion product based on a low price and may have left the second website based on these doubts. In another example, cognitive fashion product advertising process 10 may determine that fashion product 408 is e.g., a luxury pair of socks, that has a negative price elasticity at a given time (e.g., determined by cognitive fashion product advertising process 10 and/or user-specified) for its fashion-ability score. As such, cognitive fashion product advertising process 10 may pair 208 a decreased price purchase incentive to the digital advertisement to motivate user 46 to purchase the luxury pair of socks (e.g., fashion product 408). For example, user 46 may have felt that the price for the fashion product was too high and may have left the second website based on this price perception.

In another example, digital advertisement 802 may include the last fashion product viewed by the user on the second website (e.g., fashion product 408) before the user navigated away but paired 208 with a purchasing incentive (e.g., a discounted price) based upon, at least in part, the fashion-ability scores for the one or more fashion products on the second website.

In some embodiments, providing 204 the one or more digital advertisements of the one or more fashion products from the second website for rendering on the first website may include rendering 210 the one or more digital advertisements of the one or more fashion products from the second website based upon, at least in part, one or more fashion-ability scores representative of the one or more fashion products associated with the user accessing the first website and the one or more fashion-ability scores representative of the one or more fashion products on the second website. In some embodiments, cognitive fashion product advertising process 10 may provide 204 one or more digital advertisements of one or more fashion products for rendering on the first website with a fashion-ability score within a pre-defined threshold of the fashion-ability score representative of the one or more fashion products associated with the user. In some embodiments, the threshold may be automatically defined (e.g., by cognitive fashion product advertising process 10) and/or may be manually defined by a user (e.g., via a user interface). In some embodiments, cognitive fashion product advertising process 10 may provide 204 one or more digital advertisements of one or more fashion products on the second website from the same category and/or sub-category as the one or more fashion products associated with the user and with a fashion-ability score within a pre-defined threshold of the one or more fashion-ability scores representative of the one or more fashion products associated with the user. For example, suppose a user is associated (e.g., by viewing, purchasing, etc.) with a particular dress (e.g., fashion product 404) during a previous browser session and/or after the user navigates away from the second website (e.g., website 400), cognitive fashion product advertising process 10 may render (e.g., provide for rendering) one or more digital advertisements for another dress (e.g., from same category and/or sub-category) with a fashion-ability score (e.g., 0.7) within a predefined threshold (e.g., 0.05) of the fashion-ability score of the dress associated with the user (e.g., 0.74). While an example of a dress has been provided with an example fashion-ability score of e.g., 0.74, it will be appreciated that other fashion products, categories or sub-categories of fashion products, pre-defined thresholds, and fashion-ability scores are possible within the scope of the present disclosure.

In some embodiments, providing 204 the one or more digital advertisements of the one or more fashion products from the second website for rendering on the first website may include providing one or more digital advertisements of one or more fashion products on second the website from a different category than a category of the one or more fashion products associated 206 with the user. In some embodiments, this may be referred to as a cross-sell. For example, some of the most important aspects of any retail business may be customer engagement and repeat sales. A retail house valuation may be based on customer retention and repeat sales which may be a direct outcome of cross-selling fashion products. As such, cognitive fashion product advertising process 10 may provide 204 digital advertisements for other fashion products (e.g., from a different category and/or sub-category) that are part of the user's fashion taste as determined by the fashion-ability-scores of the fashion products associated with the user. For example, suppose a user is associated (e.g., by viewing, purchasing, etc.) with a particular dress (e.g., fashion product 404) during a previous browser session and/or after the user navigates away from the second website (e.g., website 400), cognitive fashion product advertising process 10 may provide 204 a digital advertisement for a scarf (e.g., fashion product 806) (e.g., from a different category and/or sub-category) with a fashion-ability score (e.g., 0.7) within a predefined threshold (e.g., 0.05) of the fashion-ability score of the dress associated with the user (e.g., 0.74). While an example of a dress has been provided with an example fashion-ability score of e.g., 0.74, it will be appreciated that other fashion products, categories or sub-categories of fashion products, pre-defined thresholds, and fashion-ability scores are possible within the scope of the present disclosure.

In some embodiments, cognitive fashion product advertising process 10 may identify 520 digital advertisements for fashion products with similar fashion-ability scores, similar or complimentary colors, and/or similar or complimentary designs from a complementary category or sub-category of fashion products on the second website based upon, at least in part, the one or more fashion products purchased and/or carted by the user. In some embodiments, the identified 520 fashion products may be added to a sequence of digital advertisements provided 204 for rendering on the first website.

In some embodiments, providing 204 the one or more digital advertisements of the one or more fashion products from the second website for rendering on the first website may include providing 212 one or more digital advertisements for one or more fashion products from the second website with a fashion-ability score greater than the fashion-ability score of the one or more fashion products associated with the user accessing the first website. For example, suppose a user is associated (e.g., by viewing, purchasing, etc.) with a particular dress (e.g., fashion product 404) during a previous browser session and/or after the user navigates away from the second website (e.g., website 400), cognitive fashion product advertising process 10 may provide a digital advertisement for a pair of shoes (e.g., from a different category and/or sub-category) with a fashion-ability score (e.g., 0.8) within a predefined threshold (e.g., 0.06) of the fashion-ability score of the dress associated with the user (e.g., 0.74). In some embodiments, the predefined threshold may be automatically defined (e.g., by cognitive fashion product advertising process 10) and/or may be manually defined by a user (e.g., via a user interface) to slowly and incrementally increase the user's fashion taste. In another example, suppose a user is associated (e.g., by viewing, purchasing, etc.) with a particular dress during a previous browser session and/or after the user navigates away from the second website (e.g., website 400), cognitive fashion product advertising process 10 may provide 204 a digital advertisement for another dress (e.g., from the same category and/or sub-category) with a fashion-ability score (e.g., 0.79) within a predefined threshold (e.g., 0.06) of the fashion-ability score of the dress associated with the user (e.g., 0.74).

In some embodiments, cognitive fashion product advertising process 10 may identify 522 fashion products for providing 204 digital advertisements on the first website with higher fashion-ability scores from the same category or sub-category of fashion products on the second website based upon, at least in part, the one or more fashion products purchased and/or carted by the user. In some embodiments, the identified 522 fashion products may include one or more fashion products that are visually similar to the one or more fashion products purchased and/or carted by the user but with a higher fashion-ability score. In some embodiments, the identified 522 fashion products may be added to a sequence of digital advertisements provided 204 for rendering on the first website.

In some embodiments, providing 204 the one or more digital advertisements of the one or more fashion products from the second website for rendering on the first website may include providing one or more digital advertisements for one or more fashion products on the second website from the same category as the fashion products associated 206 with the user that have fashion-ability scores within a threshold of the fashion-ability score of the one or more fashion products associated with the user and that have a price greater than a price of the one or more fashion products associated with the user. In some embodiments, this may be referred to as an up-sell. For example, some of the most important aspects of any retail business may be customer engagement and repeat sales. A retail house valuation may be based on customer retention and repeat sales which may be a direct outcome of up-selling fashion products. As such, cognitive fashion product advertising process 10 may provide 204 digital advertisements for other fashion products (e.g., from the same category as the fashion products with a higher price and comparable fashion-ability score) that are part of the user's fashion taste as determined by the fashion-ability-scores of the fashion products associated with the user. For example, suppose a user is associated (e.g., by viewing, purchasing, etc.) with a particular suit at a price of e.g., $399.99 during a previous browser session and/or after the user navigates away from the second website (e.g., website 400), cognitive fashion product advertising process 10 may provide 204 a digital advertisement for another suit from the same category and/or sub-category with a fashion-ability score (e.g., 0.72) on the first website (e.g., website 800) within a predefined threshold (e.g., 0.05) of the fashion-ability score of the suit associated with the user (e.g., 0.74) at a higher price (e.g., $599.99).

In some embodiments and as discussed above, cognitive fashion product advertising process 10 may identify 524 fashion products with similar fashion-ability scores from the same category or sub-category of fashion products on the second website but with a higher price based upon, at least in part, the one or more fashion products purchased and/or carted by the user. In some embodiments, the identified 524 fashion products may be added to a sequence of digital advertisements provided 204 for rendering on the first website.

In some embodiments, providing 204 the one or more digital advertisements of the one or more fashion products from the second website for rendering on the first website may include providing 214 one or more bids for bidding on the advertising opportunity on the first website. As discussed above and in some embodiments, cognitive fashion product advertising process 10 may interact with and/or communicate with demand-side platforms to provide one or more bids in a real time bid system. In some embodiments, every bid in real time bidding systems may occur in e.g., less than ten milliseconds. In some embodiments, cognitive fashion product advertising process 10 (e.g., via the demand-side platform) may provide 214 the one or more bids based upon, at least in part, one or more fashion-ability scores representative of one or more fashion-ability scores representative of the one or more fashion products available on the website and the information associated with the user accessing the website (e.g., website 300). For example, cognitive fashion product advertising process 10 may associate bids with the one or more digital advertisements provided 204 for rendering on the first website.

Figure 6:
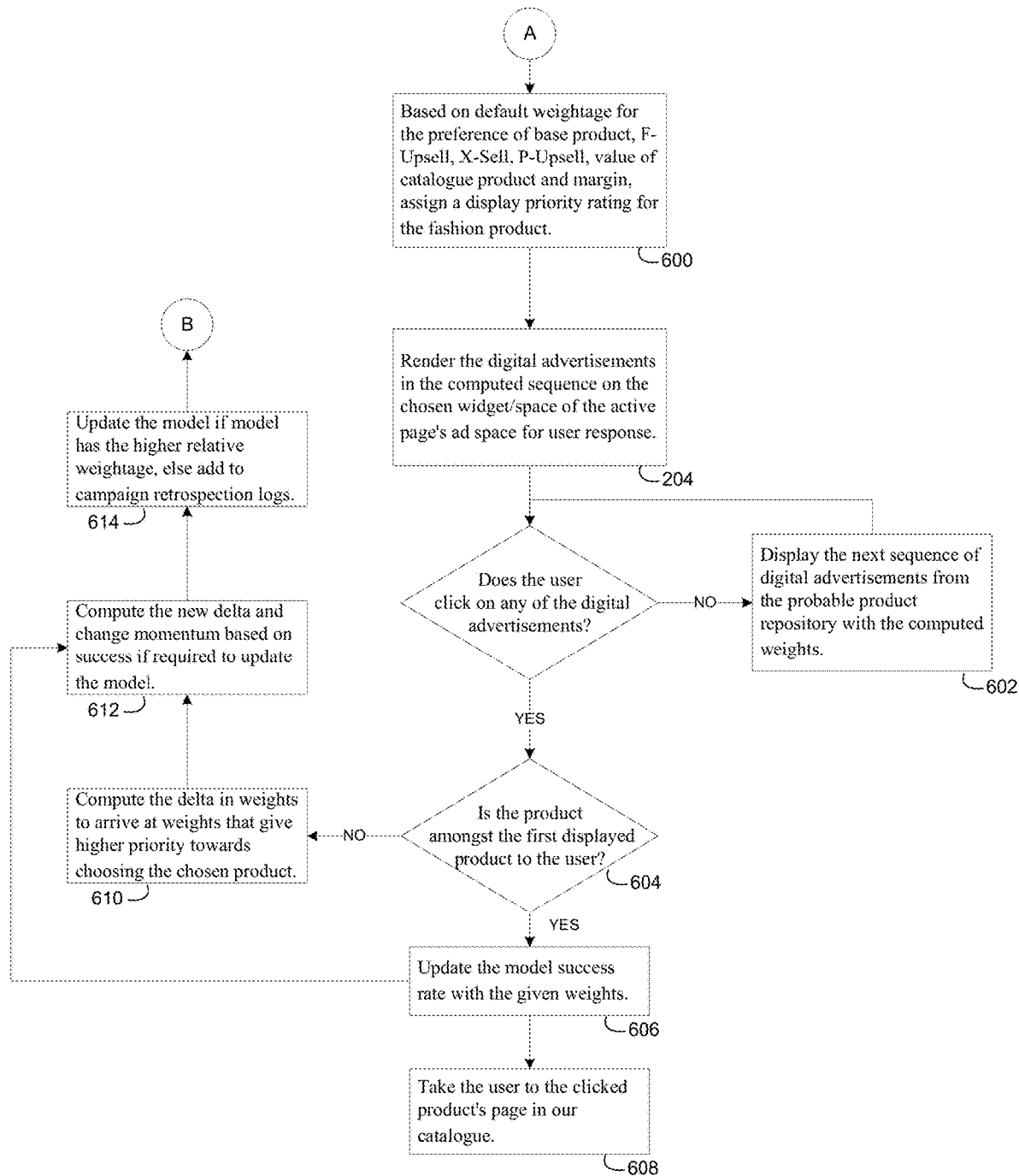

In some embodiments, cognitive fashion product advertising process 10 may provide 204 the one or more digital advertisements of the one or more fashion products from the second website for rendering on the first website based upon, at least in part, one or more weights assigned to the digital advertisements for one or more fashion products on the second website. Referring also to FIG. 6 and as discussed above, cognitive fashion product advertising process 10 may generate a prioritized sequence of digital advertisements for rendering on the first website. For example, cognitive fashion product advertising process 10 may assign 600 a display priority rating or weight for each digital advertisement (e.g., a weight for digital advertisements for fashion products with similar fashion-ability scores, a weight for digital advertisements for fashion products with higher fashion-ability scores, a weight for digital advertisements for fashion products with similar fashion-ability scores with a higher price, a weight for digital advertisements for fashion products that are visually similar to fashion products associated with the user, etc.). In some embodiments, the prioritized sequence of digital advertisements may be defined by a neural network model.

In some embodiments and as will be discussed in greater detail below, the display priority weight for the one or more digital advertisements may be defined based upon, at least in part, integration 526 with a marketing system and/or Customer Relationship Management (CRM) module (e.g., in communication with cognitive fashion product advertising process 10). For example and in some embodiments, the display priority weight for the one or more digital advertisements may be assigned based upon, at least in part, a weighting metric assigned 528 by a marketing team (e.g., user-defined) and/or by sales/CRM systems (e.g., algorithmically-defined). In some embodiments, individual parameter weights may be multiplied 530 by weights from e.g., a marketing team 528 and/or a neural network model 532).

In some embodiments, default weights may be assigned to each digital advertisement (e.g., a default weight for digital advertisements for fashion products with similar fashion-ability scores, a default weight for digital advertisements for fashion products with higher fashion-ability scores, a default weight for digital advertisements for fashion products with similar fashion-ability scores with a higher price, a default weight for digital advertisements for fashion products that are visually similar to fashion products associated with the user, etc.).

In some embodiments, cognitive fashion product advertising process 10 may modify the weights assigned to the digital advertisements of the one or more fashion products on the second website. For example, suppose a user (e.g., user 46) does not select the highest weighted or highest priority fashion product digital advertisement (e.g., digital advertisement 802). In some embodiments, cognitive fashion product advertising process 10 may provide 602 the next highest priority or fashion product digital advertisement with the next highest weight for rendering (e.g., digital advertisement 804). Cognitive fashion product advertising process 10 may repeat this process until all of a pre-defined number of digital advertisements are provided or until the user selects one of the digital advertisements.

In some embodiments and in response to the user selecting a digital advertisement, cognitive fashion product advertising process 10 may determine 604 whether the digital advertisement was among the first or highest priority digital advertisements. In some embodiments, cognitive fashion product advertising process 10 may modify the weights assigned to the one or more digital advertisements to prioritize the digital advertisement that was actually selected by the user and/or to modify to the sequence of digital advertisements based upon, at least in part, the digital advertisements actually selected by the user. For example, cognitive fashion product advertising process 10 may compute 610 the delta in weights to arrive at weights that give the higher priority towards the actually selected digital advertisement. In some embodiments, cognitive fashion product advertising process 10 may compute 612 a new delta and/or change momentum and may update 614 the neural network model if the neural network model has the higher relative weighting. Otherwise, cognitive fashion product advertising process 10 may add the modified weights to a campaign retrospection log.

In some embodiments, providing 204 the one or more digital advertisements of the one or more fashion products from the second website for rendering on the first website may include providing 216 the one or more digital advertisements of the one or more fashion products from the second website based upon, at least in part, one or more marketing objectives. A marketing objective as implemented by cognitive fashion product advertising process 10 may generally define how various weights are assigned to the one or more digital advertisements for fashion products on the second website. For example, suppose a marketing officer (e.g., user 52) of website 400 wants to emphasize e.g., customer engagement on a website as a marketing objective. This marketing objective may include the goal of increasing the number of users accessing the website with less emphasis on converting the user activity into immediate purchases. In this example, cognitive fashion product advertising process 10 may assign a first weight to digital advertisements of fashion products that are similar (e.g., based upon, at least in part, the fashion-ability scores) to those fashion products that were viewed by the user on the website. Additionally, cognitive fashion product advertising process 10 may assign a second weight to digital advertisements of fashion products that are similar (e.g., based upon, at least in part, the fashion-ability scores) to those fashion products that were added by the user to a wish list (e.g., wish list 428), where the second weight is greater than the first weight. For example and as discussed above, products placed in a wish list may be representative of products the user wants but chooses not to purchase immediately. By providing advertisements of fashion products that are similar (e.g., based upon, at least in part, the fashion-ability scores) to these wish-listed fashion products, more users may select the advertisement displayed on the first website and may spend more time on the second website (e.g., second website 800). While the above example describes the marketing objective of customer engagement on the website, it will be appreciated that other marketing objectives and weights assigned to digital advertisements are possible within the scope of the present disclosure.

Figure 9:
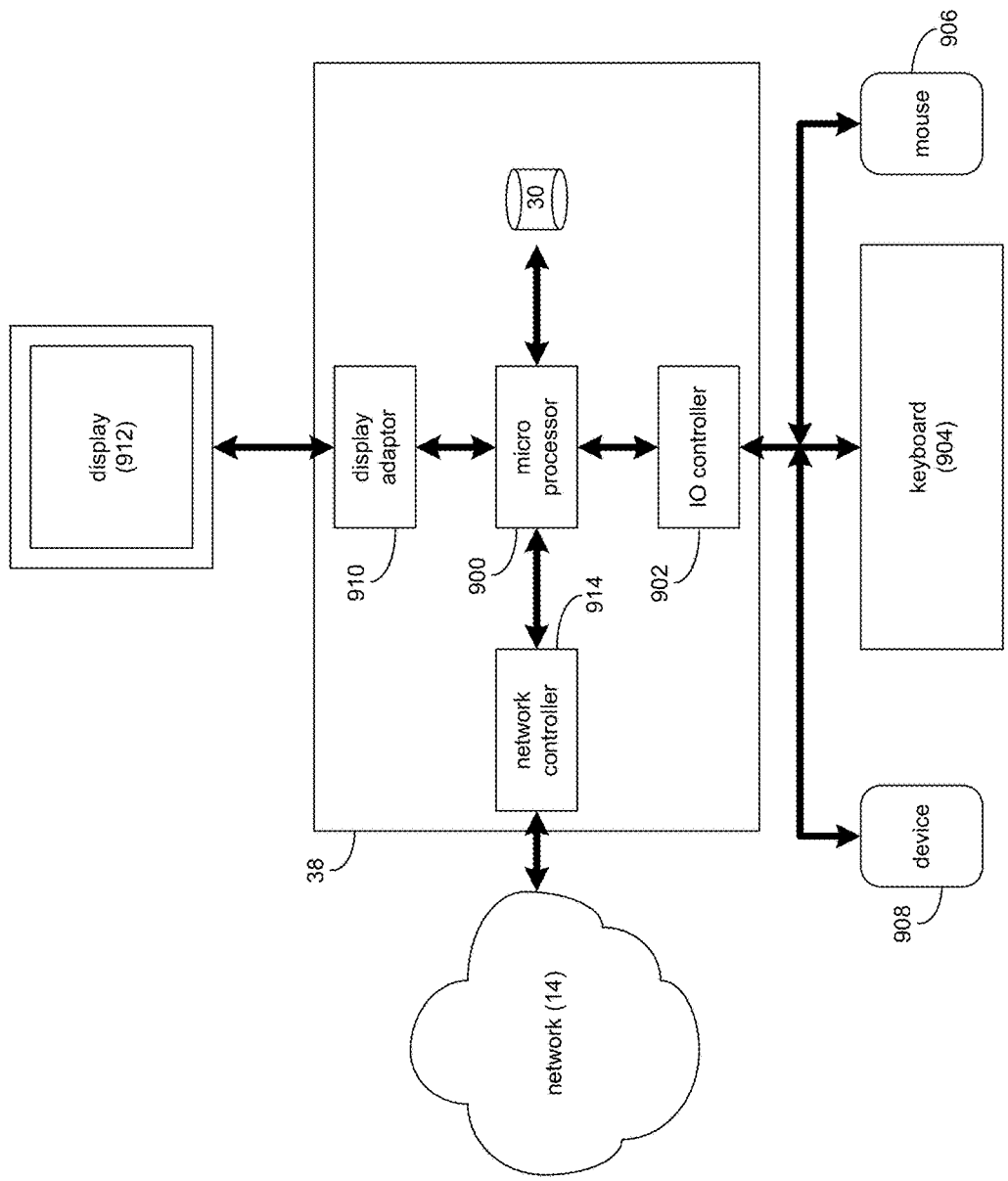
FIG. 9 is an example diagrammatic view of a client electronic device of FIG. 1 according to one or more example embodiments of the disclosure.

Referring also to FIG. 9, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, cognitive fashion product advertising process 10 may be substituted for client electronic device 38 within FIG. 9, examples of which may include but are not limited to computing device 12 and/or client electronic devices 40, 42, 44.

Client electronic device 38 may include a processor and/or microprocessor (e.g., microprocessor 900) configured to, e.g., process data and execute the above-noted code/instruction sets and subroutines. Microprocessor 900 may be coupled via a storage adaptor (not shown) to the above-noted storage device(s) (e.g., storage device 30). An I/O controller (e.g., I/O controller 902) may be configured to couple microprocessor 200 with various devices, such as keyboard 904, pointing/selecting device (e.g., mouse 706), custom device (e.g., device 908), USB ports (not shown), and printer ports (not shown). A display adaptor (e.g., display adaptor 910) may be configured to couple display 912 (e.g., CRT or LCD monitor(s)) with microprocessor 900, while network controller/adaptor 714 (e.g., an Ethernet adaptor) may be configured to couple microprocessor 900 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:
    training a plurality of neural networks from a plurality of images, wherein each neural network corresponds to an attribute of the plurality of images, a category of the plurality of images, or a sub-category of the plurality of images;
    for each trained neural network, scoring each of the plurality of images against each attribute that the neural network is trained for, and generating one or more scored vectors wherein each scored vector corresponds to a particular attribute used to train the neural network;
    joining each of the scored vectors for each of the plurality of images to form a multi-dimensional vector corresponding to a visual representation of each of the plurality of images;
    identifying, at the computing device by communicating with a demand-side platform or a supply-side platform, an advertising opportunity on a first website in response to a user accessing the first website and navigating away from the first website;
    receiving information associated with the user accessing the first website, the information comprising browsing history of a second website from the computing device of the user to determine a fashion product browsing sequence;
    generating one or more fashion-ability scores representative of the one or more fashion products, by selecting an attribute and retrieving the scored vector that is trained for the selected attribute of the plurality of images;
    in response to retrieving the scored vector trained for the selected attribute, producing a fashion-ability score that represents the fashion product for the selected attribute; and
    providing one or more digital advertisements of one or more fashion products from the second website for rendering on the first website based upon, at least in part, one or more fashion-ability scores representative of the one or more fashion products on the second website and the information associated with the user accessing the first website.

2. The computer-implemented method of claim 1, further comprising:
    pairing the one or more digital advertisements with one or more purchasing incentives based upon, at least in part, the one or more fashion-ability scores representative of the one or more fashion products on the second website.

3. The computer-implemented method of claim 1, wherein providing the one or more digital advertisements of the one or more fashion products from the second website includes:
    providing one or more bids for bidding on the advertising opportunity on the first website.

4. The computer-implemented method of claim 1, wherein receiving information associated with the user accessing the first website includes associating one or more fashion products with the user accessing the first website.

5. The computer-implemented method of claim 4, wherein providing the one or more digital advertisements of the one or more fashion products from the second website includes:
    providing the one or more digital advertisements of the one or more fashion products from the second website for rendering on the first website based upon, at least in part, one or more fashion-ability scores representative of the one or more fashion products associated with the user accessing the first website and the one or more fashion-ability scores representative of the one or more fashion products on the second website.

6. The computer-implemented method of claim 4, wherein providing the one or more digital advertisements of the one or more fashion products from the second website includes:
    providing the one or more digital advertisements for rendering on the first website for one or more fashion products from the second website with a fashion-ability score greater than the fashion-ability score of the one or more fashion products associated with the user accessing the first website.

7. The computer-implemented method of claim 1, wherein providing the one or more digital advertisements of the one or more fashion products from the second website includes:
providing the one or more digital advertisements for rendering on the first website based upon, at least in part, one or more marketing objectives.

8. A computer program product comprising a non-transitory computer readable storage medium having a plurality of instructions stored thereon, which, when executed by a processor, cause the processor to perform operations comprising:
training a plurality of neural networks from a plurality of images, wherein each neural network corresponds to an attribute of the plurality of images, a category of the plurality of images, or a sub-category of the plurality of images;
for each trained neural network, scoring each of the plurality of images against each attribute that the neural network is trained for, and generating one or more scored vectors wherein each scored vector corresponds to a particular attribute used to train the neural network;
joining each of the scored vectors for each of the plurality of images to form a multi-dimensional vector corresponding to a visual representation of each of the plurality of images;
identifying, by communicating with a demand-side platform or a supply-side platform, an advertising opportunity on a first website in response to a user accessing the first website and navigating away from the first website;
receiving information associated with the user accessing the first website, the information comprising browsing history of a second website from the computing device of the user to determine a fashion product browsing sequence;
generating one or more fashion-ability scores representative of the one or more fashion products, by selecting an attribute and retrieving the scored vector that is trained for the selected attribute of the plurality of images;
in response to retrieving the scored vector trained for the selected attribute, producing a fashion-ability score that represents the fashion product for the selected attribute; and
providing one or more digital advertisements of one or more fashion products from the second website for rendering on the first website based upon, at least in part, one or more fashion-ability scores representative of the one or more fashion products on the second website and the information associated with the user accessing the first website.

9. The computer program product of claim 8, further comprising instructions for:
pairing the one or more digital advertisements with one or more purchasing incentives based upon, at least in part, the one or more fashion-ability scores representative of the one or more fashion products on the second website.

10. The computer program product of claim 8, wherein providing the one or more digital advertisements of the one or more fashion products from the second website includes:
providing one or more bids for bidding on the advertising opportunity on the first website.

11. The computer program product of claim 8, wherein receiving information associated with the user accessing the first website includes associating one or more fashion products with the user accessing the first website.

12. The computer program product of claim 11, wherein providing the one or more digital advertisements of the one or more fashion products from the second website includes:
providing the one or more digital advertisements for rendering on the first website based upon, at least in part, one or more fashion-ability scores representative of the one or more fashion products associated with the user accessing the first website and the one or more fashion-ability scores representative of the one or more fashion products on the second website.

13. The computer program product of claim 11, wherein providing the one or more digital advertisements of the one or more fashion products from the second website includes:
providing the one or more digital advertisements for rendering on the first website for one or more fashion products from the second website with a fashion-ability score greater than the fashion-ability score of the one or more fashion products associated with the user accessing the first website.

14. The computer program product of claim 8, wherein providing the one or more digital advertisements of the one or more fashion products from the second website includes:
providing the one or more digital advertisements based upon, at least in part, one or more marketing objectives.

15. A computing system including one or more processors and one or more memories configured to perform operations comprising:
training a plurality of neural networks from a plurality of images, wherein each neural network corresponds to an attribute of the plurality of images, a category of the plurality of images, or a sub-category of the plurality of images;
for each trained neural network, scoring each of the plurality of images against each attribute that the neural network is trained for, and generating one or more scored vectors wherein each scored vector corresponds to a particular attribute used to train the neural network;
joining each of the scored vectors for each of the plurality of images to form a multi-dimensional vector corresponding to a visual representation of each of the plurality of images;
identifying, by communicating with a demand-side platform or a supply-side platform, an advertising opportunity on a first website in response to a user accessing the first website and navigating away from the first website;
receiving information associated with the user accessing the first website, the information comprising browsing history of a second website from the computing device of the user to determine a fashion product browsing sequence;
generating one or more fashion-ability scores representative of the one or more fashion products, by selecting an attribute and retrieving the scored vector that is trained for the selected attribute of the plurality of images;
in response to retrieving the scored vector trained for the selected attribute, producing a fashion-ability score that represents the fashion product for the selected attribute; and
providing one or more digital advertisements of one or more fashion products from the second website for rendering on the first website based upon, at least in part, one or more fashion-ability scores representative of the one or more fashion products on the second website and the information associated with the user accessing the first website.

16. The computing system of claim 15, wherein the operations further comprise:
  pairing the one or more digital advertisements with one or more purchasing incentives based upon, at least in part, the one or more fashion-ability scores representative of the one or more fashion products on the second website.

17. The computing system of claim 15, wherein providing the one or more digital advertisements of the one or more fashion products from the second website includes:
  providing one or more bids for bidding on the advertising opportunity on the first website.

18. The computing system of claim 15, wherein receiving information associated with the user accessing the first website includes associating one or more fashion products with the user accessing the first website.

19. The computing system of claim 18, wherein providing the one or more digital advertisements of the one or more fashion products from the second website includes:
  providing the one or more digital advertisements for rendering on the first website based upon, at least in part, one or more fashion-ability scores representative of the one or more fashion products associated with the user accessing the first website and the one or more fashion-ability scores representative of the one or more fashion products on the second website.

20. The computing system of claim 18, wherein providing the one or more digital advertisements of the one or more fashion products from the second website includes:
  providing the one or more digital advertisements for rendering on the first website for one or more fashion products from the second website with a fashion-ability score greater than the fashion-ability score of the one or more fashion products associated with the user accessing the first website.

\* \* \* \* \*